(12) United States Patent
Kaneki et al.

(10) Patent No.: US 9,213,174 B2
(45) Date of Patent: Dec. 15, 2015

(54) MICROSCOPE AND CONTROLLING METHOD

(71) Applicant: OLYMPUS CORPORATION, Shibuya-ku, Tokyo (JP)

(72) Inventors: Shinsuke Kaneki, Akiruno (JP); Koji Imazeki, Hachioji (JP); Yusuke Matsumoto, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 114 days.

(21) Appl. No.: 14/067,722

(22) Filed: Oct. 30, 2013

(65) Prior Publication Data

US 2014/0118820 A1    May 1, 2014

(30) Foreign Application Priority Data

Nov. 1, 2012   (JP) .................................. 2012-242255
Mar. 29, 2013  (JP) .................................. 2013-072212

(51) Int. Cl.
G02B 21/00   (2006.01)

(52) U.S. Cl.
CPC .................................. G02B 21/0092 (2013.01)

(58) Field of Classification Search
CPC .................................................. G02B 21/0092
USPC .................................. 359/371, 381, 385, 386
See application file for complete search history.

(56) References Cited

U.S. PATENT DOCUMENTS

| | | | |
|---|---|---|---|
| 6,930,828 B2 * | 8/2005 | Faber | 359/381 |
| 2004/0125373 A1 * | 7/2004 | Oldenbourg et al. | 356/364 |
| 2010/0284067 A1 * | 11/2010 | Matsui | 359/385 |

FOREIGN PATENT DOCUMENTS

JP            51-029149 A      3/1976

* cited by examiner

*Primary Examiner* — Frank Font
(74) *Attorney, Agent, or Firm* — Holtz, Holtz, Goodman & Chick PC

(57) ABSTRACT

A microscope includes a light source, a condenser lens disposed on an optical path of the light source to illuminate a specimen, an objective lens disposed on the optical path on an opposite side of the specimen from the condenser lens, a first polarizing plate disposed between the light source and the condenser lens, a compensator disposed between the condenser lens and the first polarizing plate to adjust retardation of light transmitted through the first polarizing plate, a second polarizing plate for transmitting only one-directional polarization component of the light transmitted through the specimen according to a relative positional relationship with the first polarizing plate, a driving unit for changing retardation of the compensator, and a control unit for causing the driving unit to drive the compensator to increase or decrease the retardation within a range including a position where the retardation is zero as a reference.

5 Claims, 38 Drawing Sheets

FIG.6

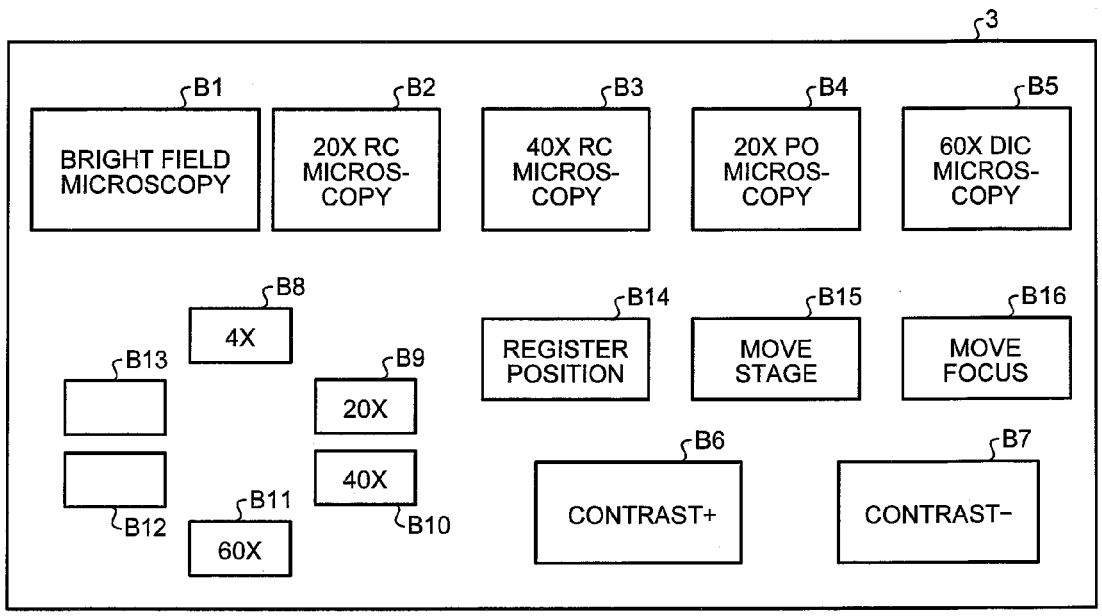

FIG.7

| | BRIGHT FIELD MICROSCOPY | 20X RC MICROSCOPY | 40X RC MICROSCOPY | 20X PO MICROSCOPY | 60X DIC MICROSCOPY |
|---|---|---|---|---|---|
| POLARIZER | PARALLEL NICOLS WITH ANALYZER | ROTATION BY ARBITRARY ANGLE | ROTATION BY ARBITRARY ANGLE | CROSSED NICOLS WITH ANALYZER | CROSSED NICOLS WITH ANALYZER |
| COMPENSATOR | ON OPTICAL PATH | ON OPTICAL PATH | ON OPTICAL PATH | ROTATION BY ARBITRARY ANGLE ON OPTICAL PATH | ON OPTICAL PATH |
| CONDENSER TURRET | EMPTY OPENING | 20X RC APERTURE | 40X RC APERTURE | EMPTY OPENING | 60X DIC PRISM |
| OBJECTIVE LENS | 4X | 20X RC | 40X RC | 20X RC | 60X |
| DIC PRISM (OBJECTIVE LENS SIDE) | OUTSIDE OPTICAL PATH | OUTSIDE OPTICAL PATH | OUTSIDE OPTICAL PATH | OUTSIDE OPTICAL PATH | ON OPTICAL PATH |
| ANALYZER | ON OPTICAL PATH | ON OPTICAL PATH | ON OPTICAL PATH | ON OPTICAL PATH | ON OPTICAL PATH |

FIG.16

|  | BF MICROS-COY | 20X RC MICROS-COPY | 40X RC MICROS-COPY | PO MICROS-COPY | DIC MICROS-COPY |
|---|---|---|---|---|---|
| OBJECTIVE LENS ON REVOLVER | 4X | FOR 20X RELIEF CONTRAST | FOR 40X RELIEF CONTRAST | FOR 20X RELIEF CONTRAST | 60X |
| OPTICAL ELEMENT ON CONDENSER TURRET | EMPTY OPENING | 20X RC APERTURE PLATE | 40X RC APERTURE PLATE | EMPTY OPENING | 60X DIC PRISM |

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 2 | ONE OPENING | 20X RC APERTURE PLATE | 2 | ONE OPENING |
| (3) | IMMOBILIZING AND ASPIRATING OF SPERM | 40X RC | 40X RC | 3 | ONE OPENING | 40X RC APERTURE PLATE | 3 | ONE OPENING |
| (4) | HOLDING OF EGG | 20X RC | 20X RC | 2 | ONE OPENING | 20X RC APERTURE PLATE | 2 | ONE OPENING |
| (5) | PIERCING OF EGG WITH INJECTION PIPETTE AND INJECTING SPERM INTO EGG | 20X RC | 20X RC | 2 | NO MOVEMENT | 20X RC APERTURE PLATE | 2 | NO MOVEMENT |
| (6) | RETURNING TO (2) | 20X RC | 20X RC | 2 | NO MOVEMENT | 20X RC APERTURE PLATE | 2 | NO MOVEMENT |

FIG.18B

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | – | EMPTY OPENING | 1 | – |
| (2) | SELECTING OF SPERM | 20X RC | 20X RC | 2 | ONE OPENING | 20X RC APERTURE PLATE | 2 | ONE OPENING |
| (3) | IMMOBILIZING AND ASPIRATING OF SPERM | 40X RC | 40X RC | 3 | ONE OPENING | 40X RC APERTURE PLATE | 3 | ONE OPENING |
| (4) | HOLDING OF EGG | 20X RC | 20X RC | 2 | ONE OPENING | 20X RC APERTURE PLATE | 2 | ONE OPENING |
| (5) | SEARCHING FOR SPINDLE IN EGG | PO | 20X RC | 2 | NO MOVEMENT | EMPTY OPENING | 1 | ONE OPENING |
| (6) | PIERCING OF EGG WITH INJECTION PIPETTE AND INJECTING SPERM INTO EGG WHILE AVOIDING SPINDLE | 20X RC | 20X RC | 2 | NO MOVEMENT | 20X RC APERTURE PLATE | 2 | ONE OPENING |
| (7) | RETURNING TO (2) | 20X RC | 20X RC | 2 | NO MOVEMENT | 20X RC APERTURE PLATE | 2 | NO MOVEMENT |

FIG.18C

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 2 | ONE OPENING | 20X RC APERTURE PLATE | 2 | ONE OPENING |
| (3) | IDENTIFYING OF STATE OF VACUOLES IN HEAD OF SPERM | DIC | 60X | 4 | TWO OPENINGS | 60X DIC PRISM | 4 | TWO OPENINGS |
| (4) | IMMOBILIZING AND ASPIRATING OF SPERM | 40X RC | 40X RC | 3 | ONE OPENING | 40X RC APERTURE PLATE | 3 | ONE OPENING |
| (5) | HOLDING OF EGG | 20X RC | 20X RC | 2 | ONE OPENING | 20X RC APERTURE PLATE | 2 | ONE OPENING |
| (6) | PIERCING OF EGG WITH INJECTION PIPETTE AND INJECTING SPERM INTO EGG | 20X RC | 20X RC | 2 | NO MOVEMENT | 20X RC APERTURE PLATE | 2 | NO MOVEMENT |
| (7) | RETURNING TO (2) | 20X RC | 20X RC | 2 | NO MOVEMENT | 20X RC APERTURE PLATE | 2 | NO MOVEMENT |

FIG.18D

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | – | EMPTY OPENING | 1 | – |
| (2) | SELECTING OF SPERM | 20X RC | 20X RC | 2 | ONE OPENING | 20X RC APERTURE PLATE | 2 | ONE OPENING |
| (3) | IDENTIFYING OF STATE OF VACUOLES IN HEAD OF SPERM | DIC | 60X | 4 | TWO OPENINGS | 60X DIC PRISM | 4 | TWO OPENINGS |
| (4) | IMMOBILIZING AND ASPIRATING OF SPERM | 40X RC | 40X RC | 3 | ONE OPENING | 40X RC APERTURE PLATE | 3 | ONE OPENING |
| (5) | HOLDING OF EGG | 20X RC | 20X RC | 2 | ONE OPENING | 20X RC APERTURE PLATE | 2 | ONE OPENING |
| (6) | SEARCHING FOR SPINDLE IN EGG | PO | 20X RC | 2 | NO MOVEMENT | EMPTY OPENING | 1 | ONE OPENING |
| (7) | PIERCING OF EGG WITH INJECTION PIPETTE AND INJECTING SPERM INTO EGG WHILE AVOIDING SPINDLE | 20X RC | 20X RC | 2 | NO MOVEMENT | 20X RC APERTURE PLATE | 2 | ONE OPENING |
| (8) | RETURNING TO (2) | 20X RC | 20X RC | 2 | NO MOVEMENT | 20X RC APERTURE PLATE | 2 | NO MOVEMENT |

FIG.21A

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | – | EMPTY OPENING | 1 | – |
| (2) | SELECTING OF SPERM | 20X RC | 20X RC | 2 | ONE OPENING | 20X RC APERTURE PLATE | 2 | ONE OPENING |
| (3) | IDENTIFYING OF STATE OF VACUOLES IN HEAD OF SPERM | DIC | 60X | 3 | ONE OPENING | 60X DIC PRISM | 3 | ONE OPENING |
| (4) | IMMOBILIZING AND ASPIRATING OF SPERM | 20X RC | 20X RC | 2 | ONE OPENING | 20X RC APERTURE PLATE | 2 | ONE OPENING |
| (5) | HOLDING OF EGG | 20X RC | 20X RC | 2 | NO MOVEMENT | 20X RC APERTURE PLATE | 2 | NO MOVEMENT |
| (6) | PIERCING OF EGG WITH INJECTION PIPETTE AND INJECTING SPERM INTO EGG | 20X RC | 20X RC | 2 | NO MOVEMENT | 20X RC APERTURE PLATE | 2 | NO MOVEMENT |
| (7) | RETURNING TO (2) | 20X RC | 20X RC | 2 | NO MOVEMENT | 20X RC APERTURE PLATE | 2 | NO MOVEMENT |

FIG.21B

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 2 | ONE OPENING | 20X RC APERTURE PLATE | 2 | ONE OPENING |
| (3) | IDENTIFYING OF STATE OF VACUOLES IN HEAD OF SPERM | DIC | 60X | 3 | ONE OPENING | 60X DIC PRISM | 3 | ONE OPENING |
| (4) | IMMOBILIZING AND ASPIRATING OF SPERM | 20X RC | 20X RC | 2 | ONE OPENING | 20X RC APERTURE PLATE | 2 | ONE OPENING |
| (5) | HOLDING OF EGG | 20X RC | 20X RC | 2 | NO MOVEMENT | 20X RC APERTURE PLATE | 2 | NO MOVEMENT |
| (6) | SEARCHING FOR SPINDLE IN EGG | PO | 20X RC | 2 | NO MOVEMENT | EMPTY OPENING | 1 | ONE OPENING |
| (7) | PIERCING OF EGG WITH INJECTION PIPETTE AND INJECTING SPERM INTO EGG WHILE AVOIDING SPINDLE | 20X RC | 20X RC | 2 | NO MOVEMENT | 20X RC APERTURE PLATE | 2 | ONE OPENING |
| (8) | RETURNING TO (2) | 20X RC | 20X RC | 2 | NO MOVEMENT | 20X RC APERTURE PLATE | 2 | NO MOVEMENT |

FIG.22A

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 2 | ONE OPENING | 20X RC APERTURE PLATE | 2 | ONE OPENING |
| (3) | IDENTIFYING OF STATE OF VACUOLES IN HEAD OF SPERM | DIC | 60X | 3 | ONE OPENING | 60X DIC PRISM | 3 | ONE OPENING |
| (4) | IMMOBILIZING AND ASPIRATING OF SPERM | DIC | 60X | 3 | NO MOVEMENT | 60X DIC PRISM | 3 | NO MOVEMENT |
| (5) | HOLDING OF EGG | 20X RC | 20X RC | 2 | ONE OPENING | 20X RC APERTURE PLATE | 2 | ONE OPENING |
| (6) | PIERCING OF EGG WITH INJECTION PIPETTE AND INJECTING SPERM INTO EGG | 20X RC | 20X RC | 2 | NO MOVEMENT | 20X RC APERTURE PLATE | 2 | NO MOVEMENT |
| (7) | RETURNING TO (2) | 20X RC | 20X RC | 2 | NO MOVEMENT | 20X RC APERTURE PLATE | 2 | NO MOVEMENT |

FIG.22B

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | – | EMPTY OPENING | 1 | – |
| (2) | SELECTING OF SPERM | 20X RC | 20X RC | 2 | ONE OPENING | 20X RC APERTURE PLATE | 2 | ONE OPENING |
| (3) | IDENTIFYING OF STATE OF VACUOLES IN HEAD OF SPERM | DIC | 60X | 3 | ONE OPENING | 60X DIC PRISM | 3 | ONE OPENING |
| (4) | IMMOBILIZING AND ASPIRATING OF SPERM | DIC | 60X | 3 | NO MOVEMENT | 60X DIC PRISM | 3 | NO MOVEMENT |
| (5) | HOLDING OF EGG | 20X RC | 20X RC | 2 | ONE OPENING | 20X RC APERTURE PLATE | 2 | ONE OPENING |
| (6) | SEARCHING FOR SPINDLE IN EGG | PO | 20X RC | 2 | NO MOVEMENT | EMPTY OPENING | 1 | ONE OPENING |
| (7) | PIERCING OF EGG WITH INJECTION PIPETTE AND INJECTING SPERM INTO EGG WHILE AVOIDING SPINDLE | 20X RC | 20X RC | 2 | NO MOVEMENT | 20X RC APERTURE PLATE | 2 | ONE OPENING |
| (8) | RETURNING TO (2) | 20X RC | 20X RC | 2 | NO MOVEMENT | 20X RC APERTURE PLATE | 2 | NO MOVEMENT |

| | BF MICROS-COPY | 20X RC MICROS-COPY | 40X RC MICROS-COPY | PO MICROS-COPY | DIC MICROS-COPY |
|---|---|---|---|---|---|
| OBJECTIVE LENS ON REVOLVER | 4X | FOR 20X RELIEF CONTRAST | FOR 40X RELIEF CONTRAST | FOR 20X PO | 60X |
| OPTICAL ELEMENT ON CONDENSER TURRET | EMPTY OPENING | 20X RC APERTURE PLATE | 40X RC APERTURE PLATE | EMPTY OPENING | 60X DIC PRISM |

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 3 | TWO OPENING | 20X RC APERTURE PLATE | 2 | ONE OPENING |
| (3) | IMMOBILIZING AND ASPIRATING OF SPERM | 40X RC | 40X RC | 4 | ONE OPENING | 40X RC APERTURE PLATE | 3 | ONE OPENING |
| (4) | HOLDING OF EGG | 20X RC | 20X RC | 3 | ONE OPENING | 20X RC APERTURE PLATE | 2 | ONE OPENING |
| (5) | PIERCING OF EGG WITH INJECTION PIPETTE AND INJECTING SPERM INTO EGG | 20X RC | 20X RC | 3 | NO MOVEMENT | 20X RC APERTURE PLATE | 2 | NO MOVEMENT |
| (6) | RETURNING TO (2) | 20X RC | 20X RC | 3 | NO MOVEMENT | 20X RC APERTURE PLATE | 2 | NO MOVEMENT |

FIG.25B

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 3 | TWO OPENING | 20X RC APERTURE PLATE | 2 | ONE OPENING |
| (3) | IMMOBILIZING AND ASPIRATING OF SPERM | 40X RC | 40X RC | 4 | ONE OPENING | 40X RC APERTURE PLATE | 3 | ONE OPENING |
| (4) | HOLDING OF EGG | 20X RC | 20X RC | 3 | ONE OPENING | 20X RC APERTURE PLATE | 2 | ONE OPENING |
| (5) | SEARCHING FOR SPINDLE IN EGG | PO | 20X PO | 2 | ONE OPENING | EMPTY OPENING | 1 | ONE OPENING |
| (6) | PIERCING OF EGG WITH INJECTION PIPETTE AND INJECTING SPERM INTO EGG WHILE AVOIDING SPINDLE | 20X RC | 20X RC | 3 | ONE OPENING | 20X RC APERTURE PLATE | 2 | ONE OPENING |
| (7) | RETURNING TO (2) | 20X RC | 20X RC | 3 | NO MOVEMENT | 20X RC APERTURE PLATE | 2 | NO MOVEMENT |

FIG.25C

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | – | EMPTY OPENING | 1 | – |
| (2) | SELECTING OF SPERM | 20X RC | 20X RC | 3 | TWO OPENINGS | 20X RC APERTURE PLATE | 2 | ONE OPENING |
| (3) | IDENTIFYING OF STATE OF VACUOLES IN HEAD OF SPERM | DIC | 60X | 5 | TWO OPENINGS | 60X DIC PRISM | 4 | TWO OPENINGS |
| (4) | IMMOBILIZING AND ASPIRATING OF SPERM | 40X RC | 40X RC | 4 | ONE OPENING | 40X RC APERTURE PLATE | 3 | ONE OPENING |
| (5) | HOLDING OF EGG | 20X RC | 20X RC | 3 | ONE OPENING | 20X RC APERTURE PLATE | 2 | ONE OPENING |
| (6) | PIERCING OF EGG WITH INJECTION PIPETTE AND INJECTING SPERM INTO EGG | 20X RC | 20X RC | 3 | NO MOVEMENT | 20X RC APERTURE PLATE | 2 | NO MOVEMENT |
| (7) | RETURNING TO (2) | 20X RC | 20X RC | 3 | NO MOVEMENT | 20X RC APERTURE PLATE | 2 | NO MOVEMENT |

FIG.25D

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 3 | TWO OPENINGS | 20X RC APERTURE PLATE | 2 | ONE OPENING |
| (3) | IDENTIFYING OF STATE OF VACUOLES IN HEAD OF SPERM | DIC | 60X | 5 | TWO OPENINGS | 60X DIC PRISM | 4 | TWO OPENINGS |
| (4) | IMMOBILIZING AND ASPIRATING OF SPERM | 40X RC | 40X RC | 4 | ONE OPENING | 40X RC APERTURE PLATE | 3 | ONE OPENING |
| (5) | HOLDING OF EGG | 20X RC | 20X RC | 3 | ONE OPENING | 20X RC APERTURE PLATE | 2 | ONE OPENING |
| (6) | SEARCHING FOR SPINDLE IN EGG | PO | 20X RC | 2 | ONE OPENING | EMPTY OPENING | 1 | ONE OPENING |
| (7) | PIERCING OF EGG WITH INJECTION PIPETTE AND INJECTING SPERM INTO EGG WHILE AVOIDING SPINDLE | 20X RC | 20X RC | 3 | ONE OPENING | 20X RC APERTURE PLATE | 2 | ONE OPENING |
| (8) | RETURNING TO (2) | 20X RC | 20X RC | 3 | NO MOVEMENT | 20X RC APERTURE PLATE | 2 | NO MOVEMENT |

FIG.28

| | BF MICROSCOPY | 10X RC MICROSCOPY | 20X RC MICROSCOPY | 40X RC MICROSCOPY | PO MICROSCOPY | DIC MICROSCOPY |
|---|---|---|---|---|---|---|
| OBJECTIVE LENS ON REVOLVER | 4X | FOR 10X RELIEF CONTRAST | FOR 20X RELIEF CONTRAST | FOR 40X RELIEF CONTRAST | FOR 20X RELIEF CONTRAST | 60X |
| OPTICAL ELEMENT ON CONDENSER TURRET | EMPTY OPENING | 10X RC APERTURE PLATE | 20X RC APERTURE PLATE | 40X RC APERTURE PLATE | EMPTY OPENING | 60X DIC PRISM |

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | 10X RC | 10X RC | 2 | - | 10X RC APERTURE PLATE | 2 | - |
| (2) | SELECTING OF SPERM | 20X RC | 20X RC | 3 | ONE OPENING | 20X RC APERTURE PLATE | 3 | ONE OPENING |
| (3) | IMMOBILIZING AND ASPIRATING OF SPERM | 40X RC | 40X RC | 4 | ONE OPENING | 40X RC APERTURE PLATE | 4 | ONE OPENING |
| (4) | HOLDING OF EGG | 20X RC | 20X RC | 3 | ONE OPENING | 20X RC APERTURE PLATE | 3 | ONE OPENING |
| (5) | PIERCING OF EGG WITH INJECTION PIPETTE AND INJECTING SPERM INTO EGG | 20X RC | 20X RC | 3 | NO MOVEMENT | 20X RC APERTURE PLATE | 3 | NO MOVEMENT |
| (6) | RETURNING TO (2) | 20X RC | 20X RC | 3 | NO MOVEMENT | 20X RC APERTURE PLATE | 3 | NO MOVEMENT |

FIG.29B

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | 10X RC | 10X RC | 2 | – | 10X RC APERTURE PLATE | 2 | – |
| (2) | SELECTING OF SPERM | 20X RC | 20X RC | 3 | ONE OPENING | 20X RC APERTURE PLATE | 3 | ONE OPENING |
| (3) | IMMOBILIZING AND ASPIRATING OF SPERM | 40X RC | 40X RC | 4 | ONE OPENING | 40X RC APERTURE PLATE | 4 | ONE OPENING |
| (4) | HOLDING OF EGG | 20X RC | 20X RC | 3 | ONE OPENING | 20X RC APERTURE PLATE | 3 | ONE OPENING |
| (5) | SEARCHING FOR SPINDLE IN EGG | PO | 20X RC | 3 | NO MOVEMENT | EMPTY OPENING | 1 | TWO OPENING |
| (6) | PIERCING OF EGG WITH INJECTION PIPETTE AND INJECTING SPERM INTO EGG WHILE AVOIDING SPINDLE | 20X RC | 20X RC | 3 | NO MOVEMENT | 20X RC APERTURE PLATE | 3 | TWO OPENING |
| (7) | RETURNING TO (2) | 20X RC | 20X RC | 3 | NO MOVEMENT | 20X RC APERTURE PLATE | 3 | NO MOVEMENT |

FIG.29C

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | 10X RC | 10X RC | 2 | - | 10X RC APERTURE PLATE | 2 | - |
| (2) | SELECTING OF SPERM | 20X RC | 20X RC | 3 | ONE OPENING | 20X RC APERTURE PLATE | 3 | ONE OPENING |
| (3) | IDENTIFYING OF STATE OF VACUOLES IN HEAD OF SPERM | DIC | 60X | 5 | TWO OPENINGS | 60X DIC PRISM | 5 | TWO OPENINGS |
| (4) | IMMOBILIZING AND ASPIRATING OF SPERM | 40X RC | 40X RC | 4 | ONE OPENING | 40X RC APERTURE PLATE | 4 | ONE OPENING |
| (5) | HOLDING OF EGG | 20X RC | 20X RC | 3 | ONE OPENING | 20X RC APERTURE PLATE | 3 | ONE OPENING |
| (6) | PIERCING OF EGG WITH INJECTION PIPETTE AND INJECTING SPERM INTO EGG | 20X RC | 20X RC | 3 | NO MOVEMENT | 20X RC APERTURE PLATE | 3 | NO MOVEMENT |
| (7) | RETURNING TO (2) | 20X RC | 20X RC | 3 | NO MOVEMENT | 20X RC APERTURE PLATE | 3 | NO MOVEMENT |

FIG.29D

| | ORDER OF PROCESSES IN ICSI | OBSER-VATION METH-OD | OBJEC-TIVE LENS | RE-VOLVER OPEN-ING NUMBER | REVOLVER MOVEMENT AMOUNT | OPTICAL ELEMENT | TUR-RET OPEN-ING NUM-BER | TURRET MOVE-MENT AMOUNT |
|---|---|---|---|---|---|---|---|---|
| (1) | POSITIONING OF NEEDLE TIP OF MANIPULATOR | 10X RC | 10X RC | 2 | – | 10X RC APER-TURE PLATE | 2 | – |
| (2) | SELECTING OF SPERM | 20X RC | 20X RC | 3 | ONE OPENING | 20X RC APER-TURE PLATE | 3 | ONE OPENING |
| (3) | IDENTIFYING OF STATE OF VACUOLES IN HEAD OF SPERM | DIC | 60X | 5 | TWO OPENINGS | 60X DIC PRISM | 5 | TWO OPEN-INGS |
| (4) | IMMOBILIZING AND ASPIRATING OF SPERM | 40X RC | 40X RC | 4 | ONE OPENING | 40X RC APER-TURE PLATE | 4 | ONE OPENING |
| (5) | HOLDING OF EGG | 20X RC | 20X RC | 3 | ONE OPENING | 20X RC APER-TURE PLATE | 3 | ONE OPENING |
| (6) | SEARCHING FOR SPINDLE IN EGG | PO | 20X RC | 3 | NO MOVEMENT | EMPTY OPENING | 1 | TWO OPEN-INGS |
| (7) | PIERCING OF EGG WITH INJECTION PIPETTE AND INJECTING SPERM INTO EGG WHILE AVOIDING SPINDLE | 20X RC | 20X RC | 3 | NO MOVEMENT | 20X RC APER-TURE PLATE | 3 | TWO OPEN-INGS |
| (8) | RETURNING TO (2) | 20X RC | 20X RC | 3 | NO MOVEMENT | 20X RC APER-TURE PLATE | 3 | NO MOVE-MENT |

FIG.30A

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 3 | TWO OPENINGS | 20X RC APERTURE PLATE | 3 | TWO OPENINGS |
| (3) | IMMOBILIZING AND ASPIRATING OF SPERM | 40X RC | 40X RC | 4 | ONE OPENING | 40X RC APERTURE PLATE | 4 | ONE OPENING |
| (4) | HOLDING OF EGG | 10X RC | 10X RC | 2 | TWO OPENINGS | 10X RC APERTURE PLATE | 2 | TWO OPENINGS |
| (5) | PIERCING OF EGG WITH INJECTION PIPETTE AND INJECTING SPERM INTO EGG | 10X RC | 10X RC | 2 | NO MOVEMENT | 10X RC APERTURE PLATE | 2 | NO MOVEMENT |
| (6) | RETURNING TO (2) | 20X RC | 20X RC | 3 | ONE OPENING | 20X RC APERTURE PLATE | 3 | ONE OPENING |

FIG.30B

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | – | EMPTY OPENING | 1 | – |
| (2) | SELECTING OF SPERM | 20X RC | 20X RC | 3 | TWO OPENINGS | 20X RC APERTURE PLATE | 3 | TWO OPENINGS |
| (3) | IMMOBILIZING AND ASPIRATING OF SPERM | 40X RC | 40X RC | 4 | ONE OPENING | 40X RC APERTURE PLATE | 4 | ONE OPENING |
| (4) | HOLDING OF EGG | 10X RC | 10X RC | 2 | TWO OPENINGS | 10X RC APERTURE PLATE | 2 | TWO OPENINGS |
| (5) | SEARCHING FOR SPINDLE IN EGG | PO | 10X RC | 2 | NO MOVEMENT | EMPTY OPENING | 1 | ONE OPENING |
| (6) | PIERCING OF EGG WITH INJECTION PIPETTE AND INJECTING SPERM INTO EGG WHILE AVOIDING SPINDLE | 10X RC | 10X RC | 2 | NO MOVEMENT | 10X RC APERTURE PLATE | 2 | ONE OPENING |
| (7) | RETURNING TO (2) | 20X RC | 20X RC | 3 | ONE OPENING | 20X RC APERTURE PLATE | 3 | ONE OPENING |

FIG.30C

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | – | EMPTY OPENING | 1 | – |
| (2) | SELECTING OF SPERM | 20X RC | 20X RC | 3 | TWO OPENINGS | 20X RC APERTURE PLATE | 3 | TWO OPENINGS |
| (3) | IDENTIFYING OF STATE OF VACUOLES IN HEAD OF SPERM | DIC | 60X | 5 | TWO OPENINGS | 60X DIC PRISM | 5 | TWO OPENINGS |
| (4) | IMMOBILIZING AND ASPIRATING OF SPERM | 40X RC | 40X RC | 4 | ONE OPENING | 40X RC APERTURE PLATE | 4 | ONE OPENING |
| (5) | HOLDING OF EGG | 10X RC | 10X RC | 2 | TWO OPENINGS | 10X RC APERTURE PLATE | 2 | TWO OPENINGS |
| (6) | PIERCING OF EGG WITH INJECTION PIPETTE AND INJECTING SPERM INTO EGG | 10X RC | 10X RC | 2 | NO MOVEMENT | 10X RC APERTURE PLATE | 2 | NO MOVEMENT |
| (7) | RETURNING TO (2) | 20X RC | 20X RC | 3 | ONE OPENING | 20X RC APERTURE PLATE | 3 | ONE OPENING |

FIG.30D

| | ORDER OF PROCESSES IN ICSI | OBSERVATION METHOD | OBJECTIVE LENS | REVOLVER OPENING NUMBER | REVOLVER MOVEMENT AMOUNT | OPTICAL ELEMENT | TURRET OPENING NUMBER | TURRET MOVEMENT AMOUNT |
|---|---|---|---|---|---|---|---|---|
| (1) | POSITIONING OF NEEDLE TIP OF MANIPULATOR | BF | 4X | 1 | - | EMPTY OPENING | 1 | - |
| (2) | SELECTING OF SPERM | 20X RC | 20X RC | 3 | TWO OPENINGS | 20X RC APERTURE PLATE | 3 | TWO OPENINGS |
| (3) | IDENTIFYING OF STATE OF VACUOLES IN HEAD OF SPERM | DIC | 60X | 5 | TWO OPENINGS | 60X DIC PRISM | 5 | TWO OPENINGS |
| (4) | IMMOBILIZING AND ASPIRATING OF SPERM | 40X RC | 40X RC | 4 | ONE OPENING | 40X RC APERTURE PLATE | 4 | ONE OPENING |
| (5) | HOLDING OF EGG | 10X RC | 10X RC | 2 | TWO OPENINGS | 10X RC APERTURE PLATE | 2 | TWO OPENINGS |
| (6) | SEARCHING FOR SPINDLE IN EGG | PO | 10X RC | 2 | NO MOVEMENT | EMPTY OPENING | 1 | ONE OPENING |
| (7) | PIERCING OF EGG WITH INJECTION PIPETTE AND INJECTING SPERM INTO EGG WHILE AVOIDING SPINDLE | 10X RC | 10X RC | 2 | NO MOVEMENT | 10X RC APERTURE PLATE | 2 | ONE OPENING |
| (8) | RETURNING TO (2) | 20X RC | 20X RC | 3 | ONE OPENING | 20X RC APERTURE PLATE | 3 | ONE OPENING |

MICROSCOPE AND CONTROLLING METHOD

CROSS REFERENCES TO RELATED APPLICATIONS

This application is based upon and claims the benefit of priorities from Japanese Patent Application No. 2012-242255, filed on Nov. 1, 2012 and Japanese Patent Application No. 2013-072212, filed on Mar. 29, 2013, the entire contents of which are incorporated herein by reference.

BACKGROUND OF THE INVENTION

1. Field of the Invention

The present invention relates to a technique of a microscope for observing a specimen mounted on a stage, and more particularly, to a microscope appropriate for micro insemination and a controlling method of the microscope.

2. Description of the Related Art

Recently, as one use of a microscope, micro insemination is known in the field of advanced reproductive medicine. The micro insemination is a process of fertilizing an egg with sperm under a microscope. In general, the micro insemination is performed by an intracytoplasmic sperm injection (hereinafter, referred to as "ICSI") method of piercing an egg fixed by a holding pipette with a sperm-containing micropipette to inject the sperm into the egg. In the ICSI, since a specimen is manipulated on a stage, an inverted microscope with a large working space above the stage is generally used.

In addition, in the field of the micro insemination, a relief contrast microscopy (hereinafter, referred to as an "RC microscopy") capable of stereoscopically observing an egg in order to improve an egg fertilization rate is known (refer to, for example, Japanese Laid-open Patent Publication No. 51-29149).

In addition, recently, in the field of the micro insemination, a micro insemination method of using a microscope while appropriately switching a plurality of observation methods in order to improve the fertilization rate has received attention. For example, a method of using a microscope while switching among an RC microscopy, a differential interference contrast microscopy (hereinafter, referred to as a "DIC microscopy"), and a polarized light microscopy (hereinafter, referred to as a "PO microscopy") depending on observation purpose is prevalent.

In the DIC microscopy, it is possible to observe an object at high magnification in comparison to the RC microscopy. Therefore, the DIC microscopy is suitable for observation of a sperm which is smaller than an egg. Accordingly, the DIC microscopy is used to select a good-quality sperm.

In addition, the PO microscopy is suitable for observation of a spindle of an egg having birefringence. Therefore, the PO microscopy is used to identify the position of the spindle while preventing the spindle from being mistakenly damaged at the time of injecting a sperm into the egg.

SUMMARY OF THE INVENTION

A microscope according to one aspect of the invention includes: a light source; a condenser lens which is disposed on an optical path of light emitted from the light source and is configured to condense the light emitted from the light source to illuminate a specimen; an objective lens which is disposed on the optical path on an opposite side of the specimen from the condenser lens; a first polarizing plate which is disposed on the optical path between the light source and the condenser lens and is configured to transmit only one-directional polarization component of the light emitted from the light source; a compensator which is disposed on the optical path between the condenser lens and the first polarizing plate and is configured to adjust retardation of light transmitted through the first polarizing plate; a second polarizing plate configured to transmit only one-directional polarization component of the light transmitted through the specimen according to a relative positional relationship with the first polarizing plate; a driving unit configured to change retardation of the compensator; and a control unit configured to cause the driving unit to drive the compensator to increase or decrease the retardation within a range including a position where the retardation is zero as a reference. The first polarizing plate and the second polarizing plate are disposed on the optical path in a crossed Nocols state in which a vibration direction of a polarization component of the light passing through the first polarizing plate and a vibration direction of a polarization component of the light passing through the second polarizing plate are perpendicular to each other.

A microscope according to another aspect of the invention includes: a light source configured to generate light to illuminate a specimen; a plurality of optical units, each of which can be disposed on an optical path of the light and is configured to change optical characteristics of the light, arrangement of each of the plurality of optical units on the optical path being configured to be changed according to each of a plurality of observation methods used for intracytoplasmic sperm injection; a condenser turret which has a disc shape and has a plurality of openings in a circumferential direction of a main surface of the condenser turret, each of the plurality of openings being capable of holding an optical element, the condenser turret being configured to be rotated about a specified axis as a rotation axis so that one of the plurality of openings can be disposed on the optical path; and a revolver which has a plurality of holding portions in a circumferential direction of a main surface of the revolver, each of the plurality of holding portions being capable of holding an objective lens, one of the plurality of holding portions being configured to be disposed on the optical path. In the condenser turret, a plurality of relief contrast microscopy aperture plates are configured to be held in the corresponding openings, and magnifications applied to the plurality of relief contrast microscopy aperture plates are gradually increased in the circumferential direction of the main surface with reference to a specified empty opening which holds no optical element among the plurality of openings. In the revolver, a plurality of relief contrast microscopy objective lenses are configured to be held in the corresponding holding portions, and magnifications of the plurality of relief contrast microscopy objective lenses are gradually increased in the circumferential direction of the main surface with reference to a first objective lens with minimum magnification held in one of the plurality of holding portions.

A controlling method according to still another aspect of the invention is performed by a microscope including a light source, a condenser lens which is disposed on an optical path of light emitted from the light source to condense the light emitted from the light source and to illuminate a specimen, an objective lens which is disposed on the optical path on an opposite side of the specimen from the condenser lens, a first polarizing plate which is disposed on the optical path between the light source and the condenser lens to transmit only one-directional polarization component of the light emitted from the light source, a compensator which is disposed on the optical path between the condenser lens and the first polarizing plate to adjust retardation of light transmitted through the first polarizing plate, and a driving unit for changing retardation of the compensator. The method includes a control step of increasing or decreasing the retardation within a range including a position where the retardation is zero as a reference by causing the driving unit to drive the compensator.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating a configuration of an operating input unit of the microscope according to the first embodiment of the present invention;

FIG. 7 is a diagram illustrating setting information recorded by a setting information recording unit of the microscope according to the first embodiment of the present invention;

FIG. 16 is a diagram illustrating setting information recorded by a setting information recording unit of the microscope according to the third embodiment of the present invention;

FIG. 18A is a diagram illustrating a procedure in the microscope according to the third embodiment of the present invention when a user performs ICSI using a BF microscopy and an RC microscopy;

FIG. 18B is a diagram illustrating a procedure in the microscope according to the third embodiment of the present invention when a user performs ICSI using the BF microscopy, the RC microscopy, and a PO microscopy;

FIG. 18C is a diagram illustrating a procedure in the microscope according to the third embodiment of the present invention when a user performs ICSI using the BF microscopy, the RC microscopy, and a DIC microscopy;

FIG. 18D is a diagram illustrating a procedure in the microscope according to the third embodiment of the present invention when a user performs ICSI using the BF microscopy, the RC microscopy, the PO microscopy, and the DIC microscopy;

FIG. 21A is a diagram illustrating a procedure in the microscope according to Modified Example 1 of the third embodiment of the present invention at the time of using 20× RC microscopy for sperm immobilization and aspiration when a user performs ICSI using the BF microscopy, the RC microscopy, and the DIC microscopy;

FIG. 21B is a diagram illustrating a procedure in the microscope according to Modified Example 1 of the third embodiment of the present invention at the time of using 20× RC microscopy for sperm immobilization and aspiration when a user performs ICSI using the BF microscopy, the RC microscopy, the PO microscopy, and the DIC microscopy;

FIG. 22A is a diagram illustrating a procedure in the microscope according to Modified Example 1 of the third embodiment of the present invention at the time of using DIC observation for sperm immobilization and aspiration when a user performs ICSI using the BF microscopy, the RC microscopy, and the DIC microscopy;

FIG. 22B is a diagram illustrating a procedure in the microscope according to Modified Example 1 of the third embodiment of the present invention at the time of using DIC observation for sperm immobilization and aspiration when a user performs ICSI using the BF microscopy, the RC microscopy, the PO microscopy, and the DIC microscopy;

FIG. 25A is a diagram illustrating a procedure in the microscope according to Modified Example 2 of the third embodiment of the present invention when a user performs ICSI using the BF microscopy and the RC microscopy;

FIG. 25B is a diagram illustrating a procedure in the microscope according to Modified Example 2 of the third embodiment of the present invention when a user performs ICSI using the BF microscopy, the RC microscopy, and the PO microscopy;

FIG. 25C is a diagram illustrating a procedure in the microscope according to Modified Example 2 of the third embodiment of the present invention when a user performs ICSI using the BF microscopy, the RC microscopy, and the DIC microscopy;

FIG. 25D is a diagram illustrating a procedure in the microscope according to Modified Example 2 of the third embodiment of the present invention when a user performs ICSI using the BF microscopy, the RC microscopy, the PO microscopy, and the DIC microscopy;

FIG. 28 is a diagram illustrating setting information recorded by a setting information recording unit of a recording unit of the microscope according to Modified Example 3 of the third embodiment of the present invention;

FIG. 29A is a diagram illustrating a procedure in the microscope according to Modified Example 3 of the third embodiment of the present invention when a user performs ICSI using the BF microscopy and the RC microscopy;

FIG. 29B is a diagram illustrating a procedure in the microscope according to Modified Example 3 of the third embodiment of the present invention when a user performs ICSI using the BF microscopy, the RC microscopy, and the PO microscopy;

FIG. 29C is a diagram illustrating a procedure in the microscope according to Modified Example 3 of the third embodiment of the present invention when a user performs ICSI using the BF microscopy, the RC microscopy, and the DIC microscopy;

FIG. 29D is a diagram illustrating a procedure in the microscope according to Modified Example 3 of the third embodiment of the present invention when a user performs ICSI using the BF microscopy, the RC microscopy, the PO microscopy, and the DIC microscopy;

FIG. 30A is a diagram illustrating a procedure in the microscope according to Modified Example 3 of the third embodiment of the present invention when a user performs ICSI using the BF microscopy and the RC microscopy;

FIG. 30B is a diagram illustrating a procedure in the microscope according to Modified Example 3 of the third embodiment of the present invention when a user performs ICSI using the BF microscopy, the RC microscopy, and the PO microscopy;

FIG. 30C is a diagram illustrating a procedure in the microscope according to Modified Example 3 of the third embodiment of the present invention when a user performs ICSI using the BF microscopy, the RC microscopy, and the DIC microscopy; and FIG. 30D is a diagram illustrating a procedure in the microscope according to Modified Example 3 of the third embodiment of the present invention when a user performs ICSI using the BF microscopy, the RC microscopy, the PO microscopy, and the DIC microscopy.

DETAILED DESCRIPTION OF THE PREFERRED EMBODIMENTS

Figure 1:
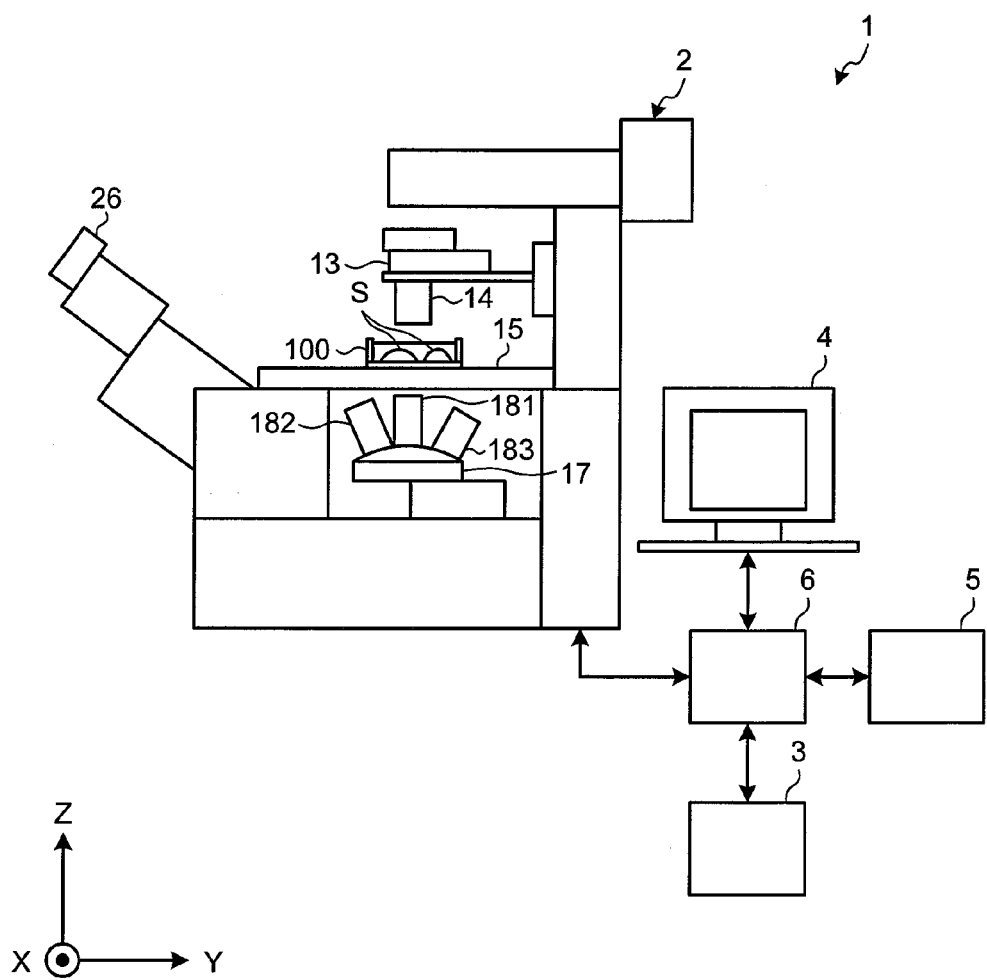
FIG. 1 is a schematic diagram illustrating a configuration of a microscope according to a first embodiment of the present invention.

Hereinafter, modes for carrying out the invention (hereinafter, referred to as embodiments) will be described with reference to the drawings. The present invention is not limited to the embodiments described hereinafter. In the drawings, the same components are denoted by the same reference numerals.

First Embodiment

Figure 2:
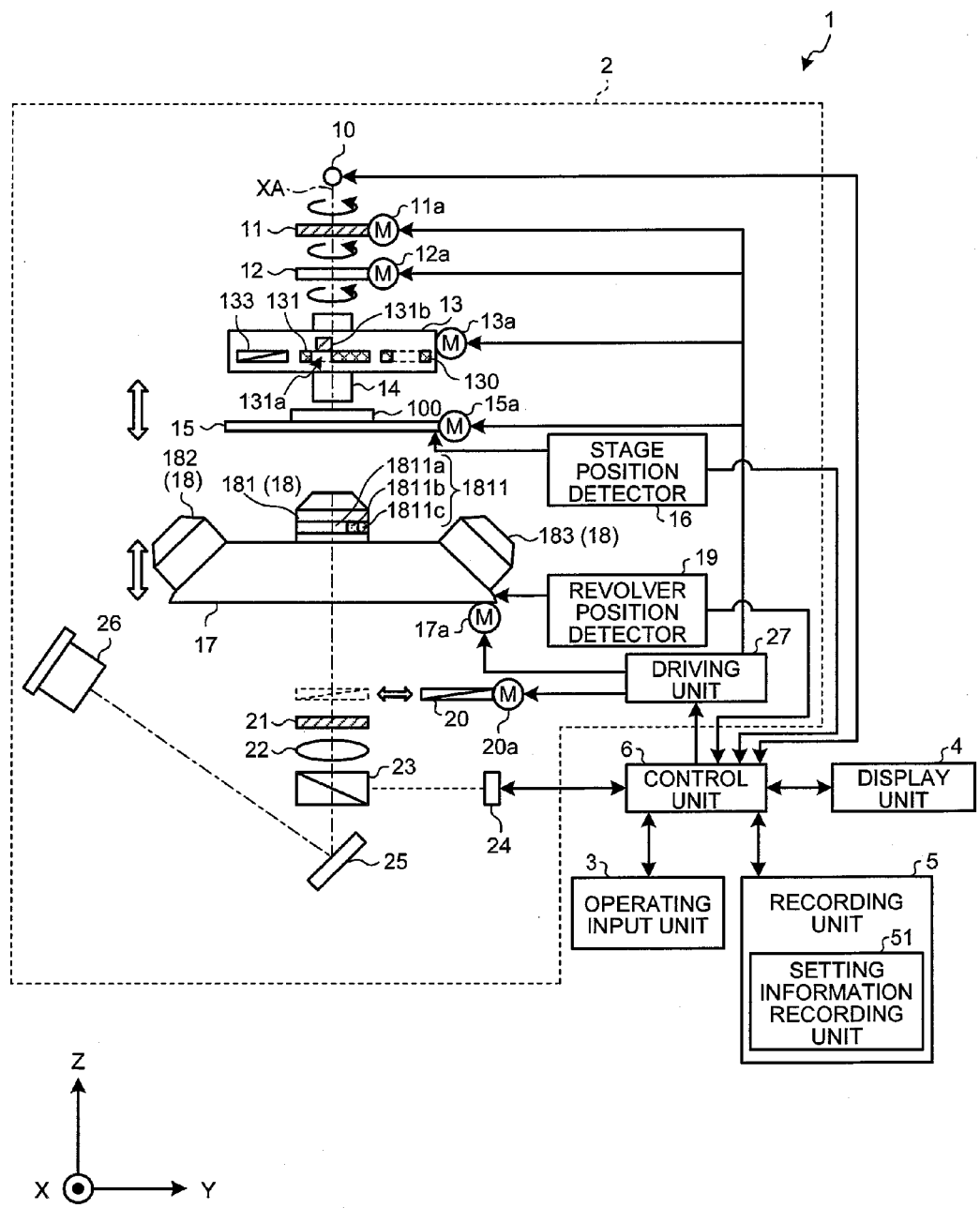
FIG. 2 is a schematic diagram illustrating a configuration of the microscope according to the first embodiment of the present invention.

FIG. 1 is a conceptual diagram illustrating a configuration of a microscope according to a first embodiment of the present invention. FIG. 2 is a schematic diagram illustrating a configuration of the microscope according to the first embodiment of the present invention. In FIGS. 1 and 2, a plane on which a microscope 1 is mounted is defined by an XY plane, and the direction perpendicular to the XY plane is denoted by the Z direction.

The microscope 1 illustrated in FIGS. 1 and 2 includes a microscope body 2 which observes a petri dish 100 containing a specimen S, an operating input unit 3 which receives input of various operations of the microscope 1, a display unit 4 which displays an image corresponding to image data captured by the microscope body 2, a recording unit 5 which records various programs or parameters for driving the microscope 1, and a control unit 6 which controls the microscope body 2 and the display unit 4. The microscope body 2, the operating input unit 3, the display unit 4, the recording unit 5, and the control unit 6 are connected to each other in a wired or wireless manner so as to communicate data with each other.

First, the microscope body 2 will be described in detail. The microscope body 2 includes a light source 10, a polarizer 11, a compensator 12, a condenser turret 13, a condenser lens 14, a stage 15, a stage position detector 16, a revolver 17, an objective lens 18, a revolver position detector 19, a DIC prism 20, an analyzer 21, a tube lens 22, an optical path splitting prism 23, an imaging unit 24, a mirror 25, an eyepiece 26, and a driving unit 27.

The light source 10 is configured with a halogen lamp, a xenon lamp, a light emitting diode (LED), or the like. The light source 10 emits illumination light toward the specimen S.

The polarizer 11 is disposed on an optical path XA between the light source 10 and the compensator 12 to transmit only a one-directional polarization component of the illumination light emitted from the light source. The polarizer 11 is disposed so as to be rotatable about the optical path XA of the light source 10. The polarizer 11 is configured by using a polarizing plate which is one of optical elements such as a filter. In addition, the polarizer 11 is rotated about an optical axis of the optical path XA by a motor 11a configured with a step motor, a DC motor, or the like under the driving control of the driving unit 27. In addition, in the first embodiment, the polarizer 11 functions as a first polarizing plate.

The compensator 12 is an optical element for measuring a phase difference due to anisotropy of a specimen S and adjusts retardation of light passing through the polarizer 11. The compensator 12 is disposed on an optical path between the condenser lens 14 and the polarizer 11 so as to be rotatable about an optical axis of the objective lens 18. The compensator 12 is configured by using liquid crystal or a wave plate. More specifically, the compensator 12 is configured by using a Berek compensator, a Senarmont-type compensator, a Brace-Koehler-type compensator, a quartz-wedge compensator, and a liquid crystal modulator. Since it is preferable that retardation of the field of view be almost uniform at the time of performing a PO microscopy for observing a spindle of an egg, the liquid crystal modulator, the Senarmont-type compensator, and the Brace-Koehler-type compensator are preferred as the compensator 12. In addition, when the liquid crystal modulator is used as the compensator 12, the retardation can be changed by electrically controlling liquid crystal molecules. In addition, when the Senarmont-type compensator is used as the compensator 12, the retardation of the compensator 12 can be changed due to the rotation of the polarizer 11 with respect to the wave plate in the compensator 12. In addition, when the Brace-Koehler-type compensator is used as the compensator 12, the retardation of the compensator 12 can be changed due to the rotation of a prism in the compensator 12. Furthermore, the compensator 12 is rotated about the optical axis of the optical path XA by a motor 12a configured with a step motor, a DC motor, or the like under the driving control of the driving unit 27.

The condenser turret 13 includes a plurality of optical elements switched for use according to an observation method or magnification and is rotatably disposed on the optical path XA. The condenser turret 13 is rotated according to the observation method, so that one of several optical elements is disposed on the optical path XA. In addition, the condenser turret 13 is rotated by a motor 13a configured with a step motor, a DC motor, or the like under the driving control of the driving unit 27.

Figure 3:
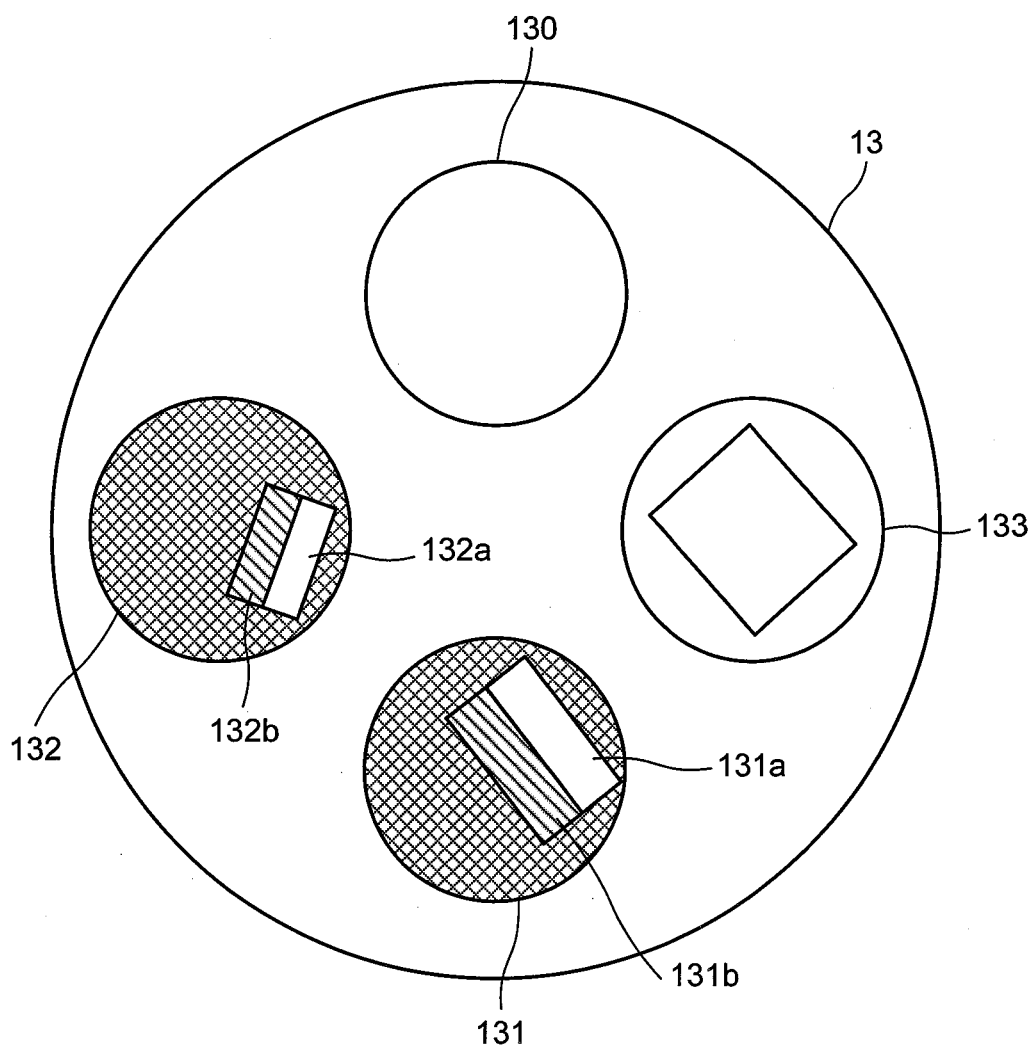
FIG. 3 is a diagram illustrating a configuration of a condenser turret of the microscope according to the first embodiment of the present invention.

FIG. 3 is a diagram illustrating a configuration of the condenser turret 13. As illustrated in FIG. 3, the condenser turret 13 includes an aperture 130, an RC microscopy aperture plate 131, an RC microscopy aperture plate 132, and a DIC prism 133.

The aperture 130 together with the condenser turret 13 constitutes an aperture plate (empty opening). The aperture 130 is formed with a sufficient size so as not to block illumination light from the light source 10 and implements illumination with high numerical aperture. The aperture 130 is used, for example, when the microscope 1 performs a bright field microscopy or the PO microscopy. More specifically, when the microscope 1 performs the bright field microscopy, the aperture 130 is used when a user performs site-searching in the petri dish 100 or positioning of a needle tip of a micropipette manipulated by a manipulator by using a 4× or 10× objective lens 18 in order to prepare micro insemination.

The RC microscopy aperture plate 131 is an aperture plate used for the RC microscopy, wherein a polarizing plate 131b is included in a portion of an aperture 131a formed at a position eccentric from the optical path XA when the RC microscopy aperture plate 131 is disposed on the optical path XA. The aperture 131a is formed at the position shifted from the center of the RC microscopy aperture plate 131, so that inclined illumination is implemented. For example, the RC microscopy aperture plate 131 is used for the case where the microscope 1 performs a 20× RC microscopy.

The RC microscopy aperture plate 132 is an aperture plate used for the RC microscopy, wherein a polarizing plate 132b is included in a portion of an aperture 132a formed at a position eccentric from the optical path XA when the RC microscopy aperture plate 132 is disposed on the optical path XA. The aperture 132a is formed at the position shifted from the center of the RC microscopy aperture plate 132, so that inclined illumination is implemented. For example, the RC microscopy aperture plate 132 is used for the case where the microscope 1 performs a 40× RC microscopy.

The DIC prism 133 is disposed on the optical path XA due to the rotation of the condenser turret 13. A pair of the DIC prism 133 and a DIC prism 20 disposed at an image side of the objective lens 18 side described later constitute a differential interference optical system. The DIC prism 133 is configured by using a Nomarski prism or the like. The DIC prism 133 is used, for example, when the microscope 1 performs a 60×DIC microscopy.

In the condenser turret 13 having the above-described configuration, the condenser turret 13 is rotated by the motor 13a according to the observation method, so that the optical element is switched so as to be disposed on the optical path XA. More specifically, in the condenser turret 13, when performing the RC microscopy, the RC microscopy aperture plate 131 or the RC microscopy aperture plate 132 is disposed on the optical path XA; when performing the DIC microscopy, the DIC prism 133 is disposed on the optical path XA; and when performing the bright field microscopy or the PO microscopy, the aperture 130 is disposed on the optical path XA.

The condenser lens 14 is disposed on the optical path XA to condense illumination light emitted from the light source 10 and uniformly illuminate the area including the specimen S in the petri dish 100. In addition, the condenser lens 14 may be provided with a field stop capable of adjusting an amount of the illumination light emitted from the light source 10 and a field stop manipulator for changing a diameter of the field stop.

The stage 15 is configured so as to be movable in the X, Y, and Z directions. The stage 15 is moved in the XY plane and in the Z direction by the driving unit 27. The petri dish 100 containing the specimen S is mounted on the stage 15. Under the control of the control unit 6, a specified origin position of the XY plane is detected by the stage position detector 16, and a driving amount of the driving unit 27 is limited by using the origin position as a start point, so that the stage 15 is moved to a desired observation site (observation area) of the specimen S. In addition, under the control of the control unit 6, a position in the Z direction is detected by the stage position detector 16, and a driving amount of the driving unit 27 is limited by using the position as a reference point, so that the stage 15 is moved to a position (in-focus position) at which the condenser lens 14 and the objective lens 18 focus on the specimen S. In addition, the stage 15 is moved in the XY plane and in the Z direction by a motor 15a configured with a step motor, a DC motor, or the like under the driving control of the driving unit 27. In addition, the stage 15 may be provided with a heating unit for maintaining a constant temperature of the petri dish 100. In addition, the stage 15 does not need to be motorized, but the stage 15 may be manually movable.

Figure 4:
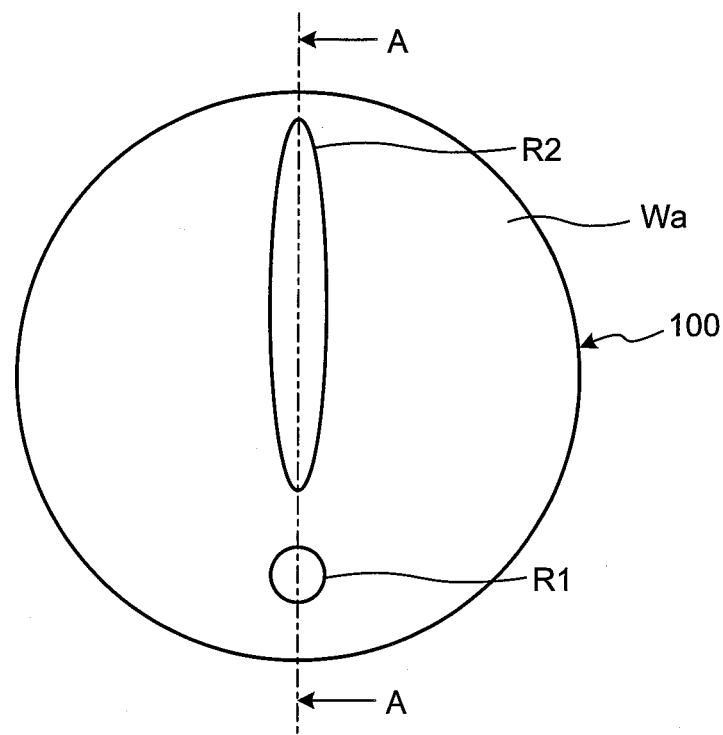
FIG. 4 is a plan view illustrating a petri dish containing a specimen.
Figure 5:
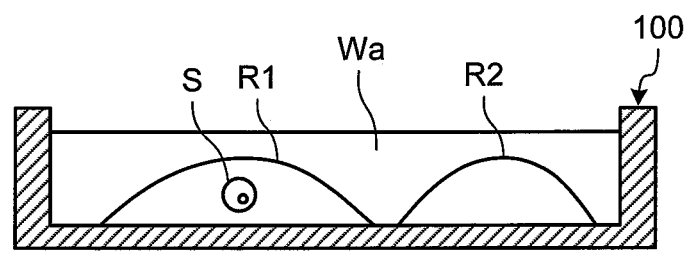
FIG. 5 is a cross-sectional view taken along line A-A of FIG. 4.

Now, the petri dish 100 on which the specimen S is disposed will be described in detail. FIG. 4 is a plan view illustrating the petri dish 100 containing the specimen S. FIG. 5 is a cross-sectional view taken along line A-A of FIG. 4. As illustrated in FIGS. 4 and 5, in the petri dish 100 used for micro insemination, an ICSI drop R1 (culture fluid) for fertilizing the egg with the sperm and a sperm selection drop R2 (culture fluid) for selecting the sperm are formed, and the drops are covered with mineral oil Wa for preventing the drops from being contaminated by bacteria due to air contact and from being dried. In addition, the number of drops on the petri dish 100 may be appropriately changed.

The stage position detector 16 is configured by using an encoder, an optical photo-interrupter, or the like. The stage position detector 16 detects a position of the stage 15 in the XY plane and in the Z direction of the stage 15 and outputs a result of the detection to the control unit 6. In addition, the stage position detector 16 may detect the position of the stage 15 based on the number of pulses of the driving unit 27 which is driven according to a driving signal input from the control unit 6 and may output a result of the detection to the control unit 6.

A plurality of objective lenses 18 are installed in the revolver 17. The revolver 17 is provided so as to be rotatable about the optical path XA and to dispose the objective lenses 18 under the specimen S. The revolver 17 is configured by using a swing revolver or the like. The revolver 17 is rotated by a motor 17a configured by a step motor, a DC motor, or the like under the driving control of the driving unit 27. In addition, the revolver 17 is provided so as to be movable in the direction of the optical path XA and is moved in the up and down directions of the Z direction by the driving unit 27. In addition, a focusing mechanism of moving the specimen side in the direction of the optical path XA may be separately provided in the revolver 17.

The objective lens 18 is disposed at a position on the optical path XA on the opposite side of the specimen S from the condenser lens 14. The objective lens 18 includes an objective lens 181, an objective lens 182, and an objective lens 183. The objective lens 181 is an objective lens having magnification suitable for observation of an egg, for example, an objective lens having low magnification such as 10× or 20× and is used for the RC microscopy. The objective lens 181 is provided with a modulator 1811 having three areas having different transmittance at the pupil position of the objective lens 181. The modulator 1811 has an area 1811a having transmittance of 100%, an area 1811b having transmittance of about 25%, and an area 1811c having transmittance of 0%. The modulator 1811 has a relationship of being optically conjugate to the RC microscopy aperture plate 131 and the RC microscopy aperture plate 132 disposed at the pupil position of the condenser lens 14. In addition, the objective lens 181 is also used for the PO microscopy requiring almost the same magnification when observing the spindle of the egg as a main observation object. The objective lens 182 is an objective lens having magnification suitable for observation of a sperm, for example, high magnification such as 60× or 100× and is used for the DIC microscopy. The objective lens 183 is an objective lens having magnification suitable for observation of a need tip of a micropipette, for example, low magnification such as 4× and is used for the bright field microscopy.

The revolver position detector 19 detects the Z-directional position of the revolver 17 and outputs a result of the detection to the control unit 6. The revolver position detector 19 is configured by using an encoder, an optical photo-interrupter, or the like. In addition, the revolver position detector 19 may detect the Z-directional position of the revolver 17 based on the number of pulses of the driving unit 27 driven according to the driving signal input from the control unit 6 and may output a result of the detection to the control unit 6.

A pair of the DIC prism 20 and the DIC prism 133 constitutes a differential interference optical system. The DIC prism 20 is configured by using a Nomarski prism or the like. The DIC prism 20 is insertably disposed on the optical path XA between the objective lens 18 and the analyzer 21. In addition, the DIC prism 20 is disposed on the optical path XA by a motor 20a configured by a step motor, a DC motor, or the like under the driving control of the driving unit 27.

The analyzer 21 is disposed on the optical path XA at the observation side of the rear stage of the objective lens 18 to transmit only one-direction polarization component of the light passing through the specimen S according to a relative positional relationship with respect to the polarizer 11. More specifically, the polarizer 11 and the analyzer 21 are disposed so as to be in a crossed Nocols state where the polarization directions thereof are perpendicular to each other. In addition, the analyzer 21 is disposed so as to be in the direction of 45 degrees with respect to the vibration direction of the polarizing plate 131b of the RC microscopy aperture plate 131 of the condenser turret 13. Therefore, the microscope 1 can perform the RC microscopy without any trouble to observation. In addition, the analyzer 21 may insertably be disposed on the optical path XA. In addition, in the first embodiment, the analyzer 21 functions as a second polarizing plate.

The tube lens 22 condenses the light emitted from the objective lens 18 to form an observation image. The tube lens 22 is configured by using one lens or a plurality of lenses.

The optical path splitting prism 23 splits the light of the observation image formed by the tube lens 22 into light to the imaging unit 24 and light to the mirror 25. The optical path splitting prism 23 is configured by using a prism of which bonded surface is coated for light splitting.

The imaging unit 24 is configured by using an image pickup element such as a charge coupled device (CCD) or a complementary metal oxide semiconductor (CMOS) and captures the observation image of the specimen S incident through the tube lens 22 and the optical path splitting prism 23 to generate image data and outputs the image data to the control unit 6.

The mirror 25 reflects the observation image emitted from the tube lens 22 toward the eyepiece 26. In addition, a plurality of relay lenses may be provided on the optical path between the mirror 25 and the eyepiece 26.

The eyepiece 26 magnifies the observation image incident through the tube lens 22, the optical path splitting prism 23, and the mirror 25. The eyepiece 26 is configured by using one lens or a plurality of lenses.

The driving unit 27 is configured by using a driver to move or rotate optical elements of the microscope body 2 under the control of the control unit 6. More specifically, the driving unit 27 drives the motor 11a, the motor 12a, the motor 13a, the motor 15a, the motor 17a, and the motor 20a under the control of the control unit 6 to rotate or move the polarizer 11, the compensator 12, the condenser turret 13, the stage 15, the revolver 17, the DIC prism 20, and the analyzer 21 to specified positions.

The operating input unit 3 receives inputs of various operations of the microscope 1. The operating input unit 3 is configured by using a keyboard, a mouse, a joystick, a touch panel, various buttons, and the like and outputs operating signals to the control unit 6 according to various switch operating inputs.

FIG. 6 is a diagram illustrating a configuration of the operating input unit 3. As illustrated in FIG. 6, the operating input unit 3 includes buttons B1 to B5 for receiving input of an instruction signal instructing each observation method, buttons B6 and B7 for receiving input of an instruction signal for adjusting contrast, buttons B8 to B13 for receiving input of an instruction signal for instructing magnification of the objective lens 18, a button B14 for receiving input of an instruction signal for registering a position of the stage 15, a button B15 for receiving input of an instruction signal for instructing XY-plane movement of the stage 15, and a button B16 for receiving input of an instruction signal for instructing Z-directional movement of the stage 15.

The display unit 4 is configured by using a display panel constructed with liquid crystal elements or organic electro luminescence (EL) diodes. The display unit 4 displays an image corresponding to the image data input from the imaging unit 24 through the control unit 6.

The recording unit 5 records various programs executed in the microscope 1 and various data used during the execution of the programs. The recording unit 5 is configured by using semiconductor memory such as flash memory or a random access memory (RAM). In addition, the recording unit 5 stores information on the arrangement of optical elements on the optical path XA for each observation method.

FIG. 7 is a diagram illustrating setting information recorded by a setting information recording unit 51. As illustrated in FIG. 7, position information of each optical element corresponding to each observation method is recorded as setting information T1. More specifically, as illustrated in FIG. 7, when performing the bright field microscopy, the polarizer 11 is disposed so as to be in a parallel Nocols state with respect to the analyzer 21, the compensator 12 is disposed on the optical path XA, the empty opening (aperture 130) of the condenser turret 13 is disposed on the optical path XA, the objective lens 18 has magnification of 4×, the DIC prism 20 is disposed outside the optical path XA, the analyzer 21 is disposed on the optical path XA, and the stage 15 is disposed at the ICSI drop R1.

The control unit 6 is configured by using a central processing unit (CPU) and the like and controls overall operations of components constituting the microscope 1. The control unit 6 drives units constituting the microscope 1 according to the operating signal input from the operating input unit 3. More specifically, when an instruction signal for instructing the bright field microscopy is input from the operating input unit 3, the control unit 6 drives the polarizer 11, the compensator 12, the condenser turret 13, the stage 15, the revolver 17, the DIC prism 20, and the analyzer 21 according to the observation method to dispose these components on the optical path XA with reference to the setting information recorded by the setting information recording unit 51 so as to change the observation method into the observation method instructed by the instruction signal. For example, when the DIC observation is instructed according to the instruction signal input from the operating input unit 3, the control unit 6 drives the driving unit 27 to rotate the revolver 17 so as to dispose the objective lens 182 on the optical path XA and to rotate the condenser turret 13 so as to dispose the DIC prism 133 and the DIC prism 20 on the optical path XA. In addition, when the microscope 1 performs the PO microscopy, the control unit 6 allows the driving unit 27 to drive the compensator 12 within a range including the position where retardation is zero as a reference so as to increase or decrease the retardation. More specifically, the control unit 6 causes the driving unit 27 to repetitively rotate the compensator 12 within an angular range including the position where retardation is zero.

The microscope 1 having the above-described configuration can perform the bright field microscopy, the RC microscopy, and the DIC microscopy by switching the arrangement positions of the polarizer 11, the compensator 12, the condenser turret 13, the revolver 17, the DIC prism 20, and the analyzer 21 on the optical path XA under the control of the control unit 6. For example, when the microscope 1 performs the RC microscopy as an observation method, the control unit 6 disposes the objective lens 181 on the optical path XA by rotating the revolver 17 and disposes the RC microscopy aperture plate 131 on the optical path XA by rotating the condenser turret 13. In addition, the control unit 6 disposes the DIC prism 20 outside the optical path XA. Therefore, the observation method of the microscope 1 can be switched to the RC microscopy.

In addition, when the microscope 1 performs the DIC microscopy as an observation method, the control unit 6 disposes the objective lens 182 on the optical path XA by rotating the revolver 17 and disposes the DIC prism 133 on the optical path XA by rotating the condenser turret 13. In addition, the control unit 6 disposes the DIC prism 20 on an observation optical path L2 by driving the driving unit 27 and allows the polarizer 11 and the analyzer 21 to be in the crossed Nocols state by rotating the polarizer 11 about the optical axis of the optical path XA. Therefore, the observation method of the microscope 1 can be switched to the DIC microscopy.

Figure 8:
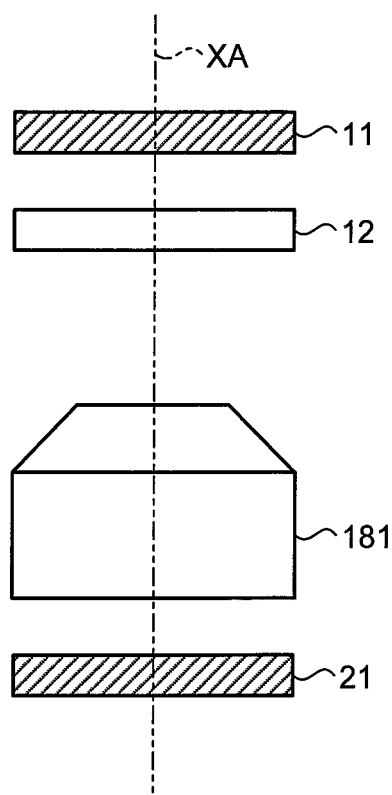
FIG. 8 is a schematic diagram illustrating arrangement of optical elements when the microscope according to the first embodiment of the present invention performs a polarized light microscopy.

In addition, when the microscope 1 performs the PO microscopy as an observation method, the control unit 6 disposes the objective lens 181 on the optical path XA by rotating the revolver 17 and disposes the aperture 130 (empty opening) on the optical path XA by rotating the condenser turret 13. In addition, the control unit 6 disposes the compensator 12 on the optical path XA. More specifically, as illustrated in FIG. 8, the control unit 6 disposes the polarizer 11, the compensator 12, the objective lens 181, and the analyzer 21 on the optical path XA by driving the driving unit 27. In this case, the control unit 6 drives the driving unit 27 to dispose the polarizer 11 on the optical path XA by rotating the polarizer 11 so that the polarizer 11 and the analyzer 21 are in the crossed Nocols state. Therefore, the observation method of the microscope 1 can be switched to the PO microscopy.

Figure 9:
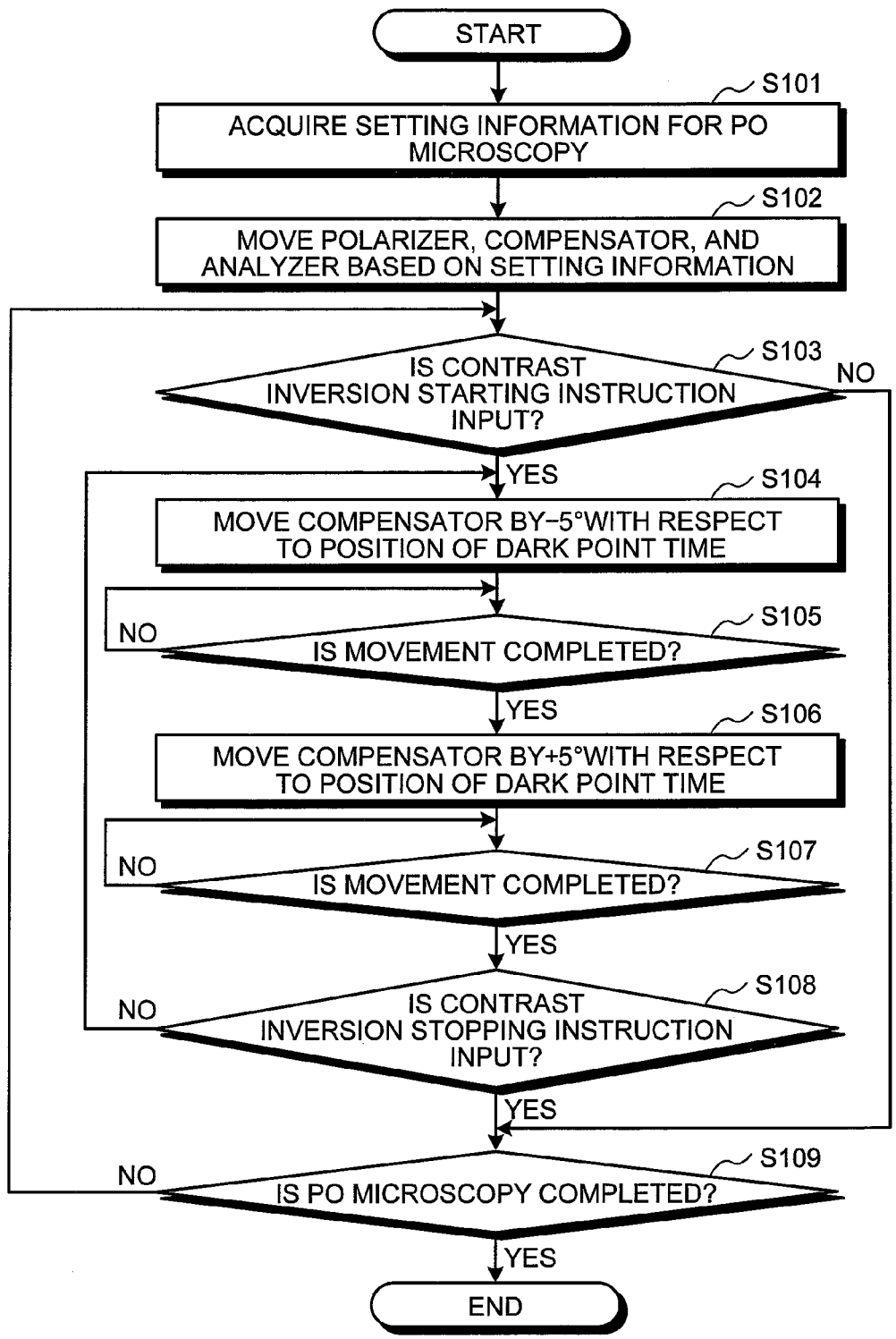
FIG. 9 is a flowchart illustrating overview of processes performed by the microscope according to the first embodiment of the present invention.

Next, processes performed by the microscope 1 will be described. FIG. 9 is a flowchart illustrating overview of the processes performed by the microscope 1. In addition, in the following flowchart, the processes of the PO microscopy performed by the microscope 1 will be described.

As illustrate in FIG. 9, when an instruction signal for instructing the PO microscopy is input from the operating input unit 3, the control unit 6 acquires setting information for the PO microscopy from the setting information recording unit 51 of the recording unit 5 (Step S101).

Subsequently, the control unit 6 moves the polarizer 11, the compensator 12, and the analyzer 21 to specified positions on the optical path XA by driving the driving unit 27 based on the setting information acquired from the setting information recording unit 51 (Step S102). At this time, the control unit 6 drives the driving unit 27 to dispose the aperture 130 on the optical path XA by rotating the condenser turret 13 and to move the DIC prism 20 outside the optical path XA.

Next, the control unit 6 determines whether or not an instruction signal for starting contrast inversion is input from the operating input unit 3 (Step S103). When the control unit 6 determines that the instruction signal for starting contrast inversion is input from the operating input unit 3 (Yes in Step S103), the microscope 1 proceeds to Step S104 described later. On the contrary, when the control unit 6 determines that the instruction signal for starting contrast inversion is not input from the operating input unit 3 (No in Step S103), the control unit 6 proceeds to Step S109.

In Step S104, the control unit 6 drives the driving unit 27 to move the compensator 12 by −5° with respect to the position of the dark point time.

Figure 10:
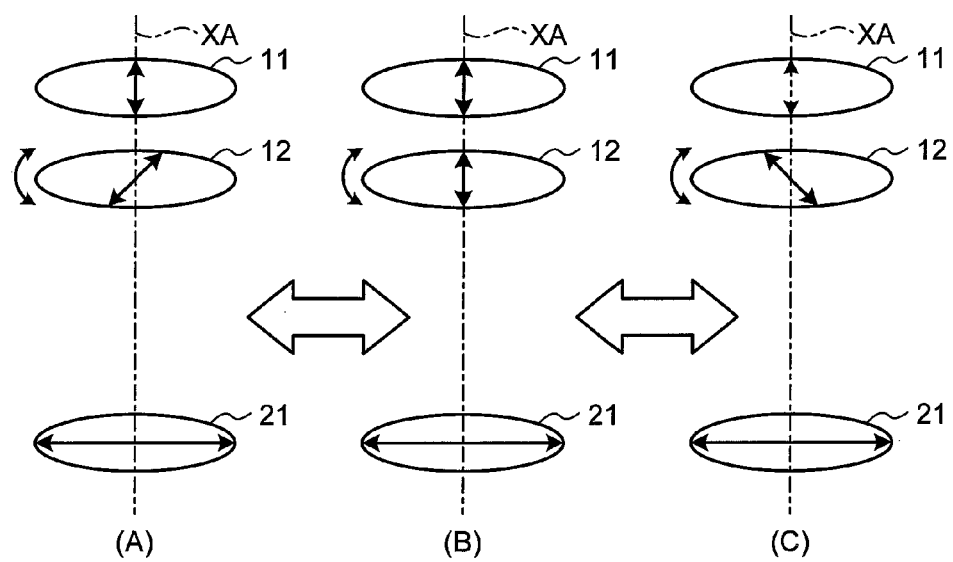
FIG. 10 is a diagram illustrating a positional relationship among a polarizer, a compensator, and an analyzer when the microscope according to the first embodiment of the present invention observes contrast of a specimen by polarized light microscopy.
Figure 11:
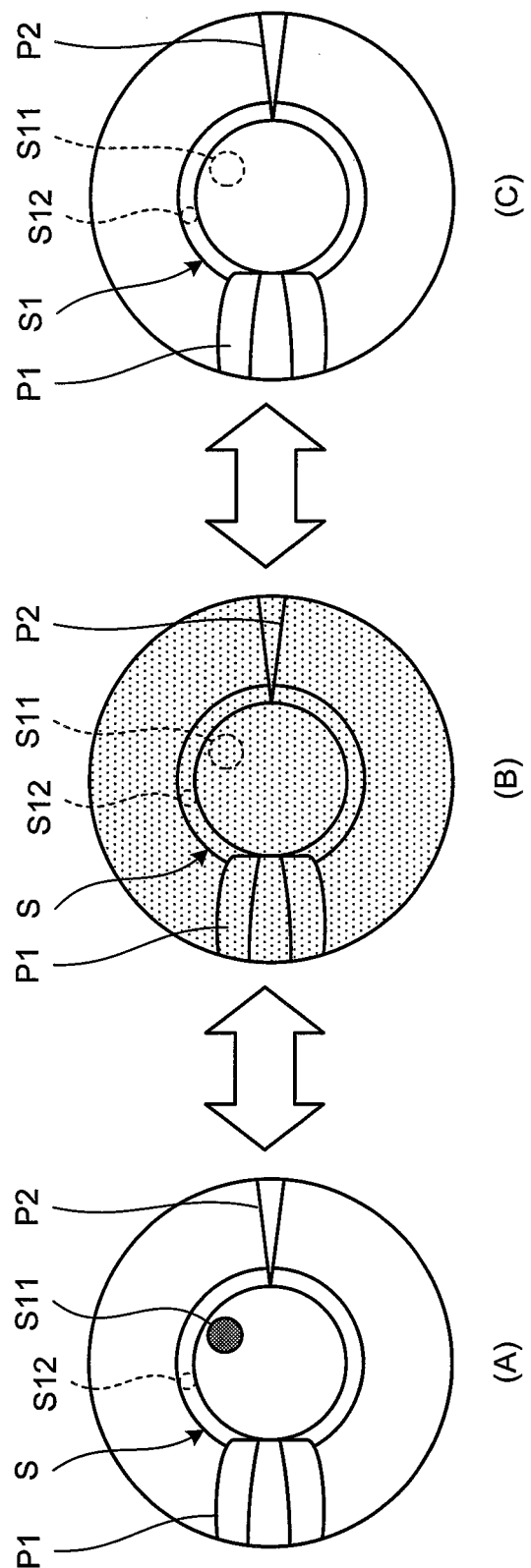
FIG. 11 is a diagram illustrating an example of an image of a specimen observed in the situation illustrated in FIG. 10.

FIG. 10 is a diagram illustrating a positional relationship among the polarizer 11, the compensator 12, and the analyzer 21 at the time of observing the contrast of the specimen S by using the PO microscopy. FIG. 11 is a diagram illustrating an example of an image of the specimen S observed in the situation illustrated in FIG. 10. In addition, in FIG. 10, the position of the compensator 12 where retardation is zero is defined as the dark point; the rightward rotation as viewed from the light source 10 is defined as negative; and the leftward rotation is defined as positive. Herein, the dark point denotes the state where the analyzer 21 and polarizer 11 are adjusted so as to be in the crossed Nocols state where the vibration direction of the light passing through the polarizer 11 and the vibration direction of the light passing through the analyzer 21 are perpendicular to each other and, after that, the vibration direction of the light passing through the analyzer 21 and the vibration direction of the light passing through the compensator 12 are adjusted in to be perpendicular to each other (refer to B of FIG. 10).

As illustrated in FIGS. 10 and 11, the control unit 6 drives the driving unit 27 to rotate the compensator 12 by −5° in the rightward direction from the state where the retardation of the compensator 12 is 0. Therefore, the contrast of the spindle S11 of the specimen S (egg) fixed by the holding pipette P1 and the injection pipette P2 is brightened (refer to C of FIG. 11).

After Step S104, when the movement of the compensator 12 is completed (Yes in Step S105), the microscope 1 proceeds to Step S106. On the contrary, when the movement of the compensator 12 is not completed (No in Step S105), the microscope 1 stands by until the movement of the compensator 12 is completed.

In Step S106, the control unit 6 drives the driving unit 27 to move the compensator 12 by +5° with respect to the position of the dark point time. More specifically, as illustrated in FIGS. 10 and 11, the control unit 6 drives the driving unit 27 to rotate the compensator 12 by +10° in the leftward direction (C of FIG. 10→B of FIG. 10→A of FIG. 10). Accordingly, the contrast of the spindle S11 of the specimen S is darkened (refer to B of FIG. 11).

Subsequently, when the movement of the compensator 12 is completed (Yes in Step S107), the microscope 1 proceeds to Step S108. On the contrary, when the movement of the compensator 12 is not completed (No in Step S107), the microscope 1 stands by until the movement of the compensator 12 is completed.

In the Step S108, when an instruction signal for stopping contrast inversion is input from the operating input unit 3 (Yes in Step S108), the microscope 1 proceeds to Step S109. On the contrary, when the instruction signal for stopping contrast inversion is not input from the operating input unit 3 (No in Step S108), the microscope 1 returns to Step S104.

Subsequently, when an instruction signal for ending the PO microscopy is input from the operating input unit 3 (Yes in Step S109), the microscope 1 ends the process. On the contrary, when the instruction signal for ending the PO microscopy is not input from the operating input unit 3 (No in Step S109), the microscope 1 returns to Step S103.

According to the above-described first embodiment of the present invention, since the control unit 6 repetitively rotates the compensator 12 by driving the driving unit 27 so that the retardation of the compensator 12 is increased or decreased by using the position where the retardation is zero as a reference, the contrast of the spindle is automatically inverted. Therefore, a user can identify the position of a spindle in an egg by simple and easy operation (refer to A of FIG. 11), can securely avoid erroneously piercing the spindle in the egg with a sperm-containing micropipette, and can reduce the operating time of the microscope 1.

Second Embodiment

Next, a second embodiment of the present invention will be described. A microscope according to the second embodiment has the same configuration as that of the microscope according to the above-described first embodiment, and the process using the PO microscopy performed by the microscope is different between the two embodiments. Therefore, hereinafter, the process using the PO microscopy performed by the microscope according to the second embodiment will be described. The same components as those of the microscope 1 according to the above-described first embodiment are denoted by the same reference numerals, and the description thereof is not provided.

Figure 12:
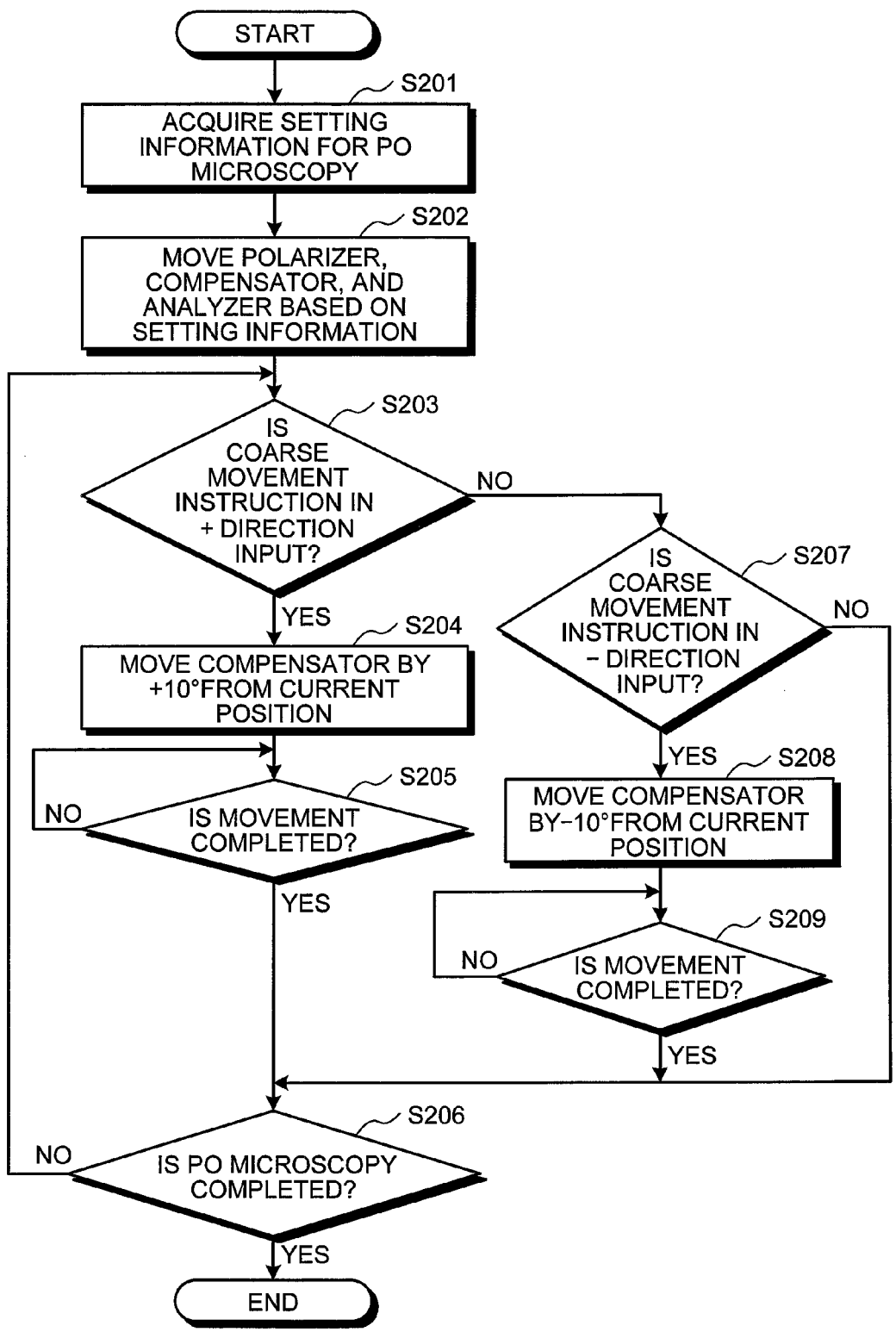
FIG. 12 is a flowchart illustrating overview of processes performed by a microscope according to a second embodiment of the present invention.

FIG. 12 is a flowchart illustrating overview of processes using the PO microscopy performed by the microscope 1 according to the second embodiment.

Step S201 and Step S202 illustrated in FIG. 12 correspond to Step S101 and Step S102 illustrated in FIG. 9, respectively.

In Step S203, the control unit 6 determines whether or not a coarse movement instruction signal for coarsely moving the compensator 12 in the positive (+) direction is input from the operating input unit 3. When the control unit 6 determines that the coarse movement instruction signal for coarsely moving the compensator 12 in the positive (+) direction is input from the operating input unit 3 (Yes in Step S203), the microscope 1 proceeds to Step S204 described later. On the contrary, when the control unit 6 determines that the coarse movement instruction signal for coarsely moving the compensator 12 in the positive (+) direction is not input from the operating input unit 3 (No in Step S203), the microscope 1 proceeds to Step S207 described later.

In Step S204, the control unit 6 drives the driving unit 27 to move the compensator 12 by +10° from the current position.

Subsequently, when the movement of the compensator 12 is completed (Yes in Step S205), the microscope 1 proceeds to Step S206. On the contrary, when the movement of the compensator 12 is not completed (No in Step S205), the microscope 1 stands by until the movement of the compensator 12 is completed.

In Step S206, when an instruction signal for ending the PO microscopy is input from the operating input unit 3 (Yes in Step S206), the microscope 1 ends the process. On the contrary, when the instruction signal for ending the PO microscopy is not input from the operating input unit 3 (No in Step S206), the microscope 1 returns to Step S203.

In Step S207, the control unit 6 determines whether or not the coarse movement instruction signal for coarsely moving the compensator 12 in the negative (−) direction is input from the operating input unit 3. When the control unit 6 determines that the coarse movement instruction signal for coarsely moving the compensator 12 in the negative (−) direction is input from the operating input unit 3 (Yes in Step S207), the microscope 1 proceeds to Step S208 described later. On the contrary, the control unit 6 determines that the coarse movement instruction signal for coarsely moving the compensator 12 in the negative (−) direction is not input from the operating input unit 3 (No in Step S207), the microscope 1 proceeds to Step S206 described later.

In Step S208, the control unit 6 drives the driving unit 27 to move the compensator 12 by −10° from the current position.

Subsequently, when the movement of the compensator 12 is completed (Yes in Step S209), the microscope 1 proceeds to Step S206. On the contrary, when the movement of the compensator 12 is not completed (No in Step S209), the microscope 1 stands by until the movement of the compensator 12 is completed.

According to the second embodiment of the present invention described hereinbefore, since the control unit 6 rotates the compensator 12 by a specified angle about the optical axis XA according to the instruction signal for rotating the compensator 12 input from the operating input unit 3, it is possible to dynamically change the contrast of the spindle having a polarization characteristic; and since the control unit 6 rotates the compensator 12 to cross in the vicinity of the dark point, it is possible to simply and easily invert the darkness and brightness of the contrast of the spindle. As a result, even a novice of a microscope can easily identify the position of the spindle in the egg without checking of the movement amount for inverting the contrast, the position of the dark point, and the like.

In the first and second embodiments of the present invention, the control unit 6 may automatically switch the units based on an instruction signal for selecting a drop position input from the operating input unit 3. As a result, it is possible to reduce the operating time of the microscope 1, and it is possible to reduce the stress occurring at the time of injecting the sperm into the egg.

In addition, in the first and second embodiments of the present invention, when switching a low-magnification objective lens 18 to a high-magnification objective lens 18 or switching a high-magnification objective lens 18 to a low-magnification objective lens 18, the control unit 6 may adjust the focus on the specimen S by driving the driving unit 27 to move the revolver 17 or the stage 15 in the Z direction based on the Z-directional position information of the stage 15 or the Z-directional position information of the revolver 17 in the setting information recorded by the setting information recording unit 51. Therefore, it is possible to further reduce the operating time of the microscope 1.

In addition, in the first and second embodiments of the present invention, the example of the microscope including the microscope body, the operating input unit, the display unit, the recording unit, and the control unit is described. However, the present invention may be applied to, for example, an imaging apparatus such as a video microscope including an objective lens for magnifying a specimen, an imaging function of imaging the specimen through the objective lens, and a display function of displaying an image.

In addition, in the first and second embodiments of the present invention, the example of the inverted microscope apparatus used for ICSI of injecting the sperm into the egg as a microscope apparatus is described. However, the present invention may be applied to, for example, an upright microscope apparatus. In addition, the present invention may be applied to various systems such as a line apparatus assembled with a microscope apparatus.

In addition, in the first and second embodiments of the present invention, the polarizer is rotated in order to allow the polarizer and the analyzer to be in the crossed Nocols state. However, the present invention may be applied to, for example, the case where the analyzer is rotated. In addition, the present invention may also be applied to the case where the polarizer and the analyzer are individually rotated.

Third Embodiment

Next, a third embodiment of the present invention will be described. A microscope according to the third embodiment has the same configuration as that of the microscope according to the above-described first embodiment, and the process performed by the microscope is different between the two embodiments. Therefore, hereinafter, the configuration of the microscope according to the third embodiment will be described, and after that, the process performed by the microscope according to the third embodiment will be described. The same components as those of the microscope 1 according to the above-described first embodiment are denoted by the same reference numerals, and the description thereof is not provided.

Figure 13:
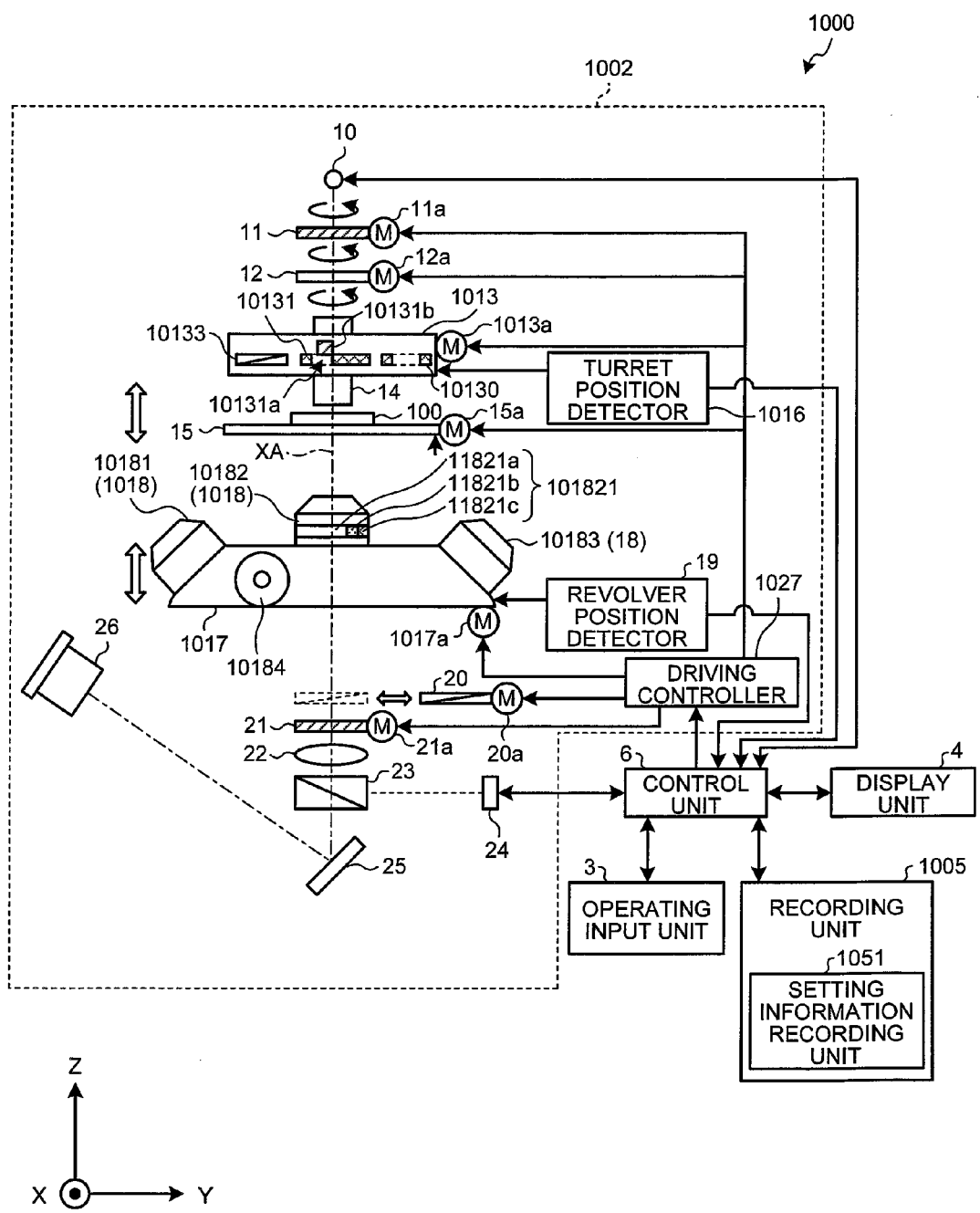
FIG. 13 is a block diagram illustrating a configuration of a microscope according to a third embodiment of the present invention.

FIG. 13 is a block diagram illustrating a configuration of the microscope according to the third embodiment of the present invention. In FIG. 13, a plane on which a microscope 1000 is mounted is defined by an XY plane, and the direction perpendicular to the XY plane is defined by the Z direction.

The microscope 1000 illustrated in FIG. 13 includes a microscope body 1002 which observes the petri dish 100 containing the specimen S, the display unit 4, a recording unit 1005 which records various programs or parameters for driving the microscope 1000, and the control unit 6. The microscope body 1002, the operating input unit 3, the display unit 4, the recording unit 1005, and the control unit 6 are connected to each other in a wired or wireless manner so as to communicate data with each other.

First, the microscope body 1002 will be described in detail. The microscope body 1002 includes the light source 10, the polarizer 11, the compensator 12, a condenser turret 1013, the condenser lens 14, the stage 15, a turret position detector 1016, a revolver 1017, an objective lens 1018, the revolver position detector 19, the DIC prism 20, the analyzer 21, the tube lens 22, the optical path splitting prism 23, the imaging unit 24, the mirror 25, the eyepiece 26, and a driving controller 1027.

The light source 10 generates light for illuminating the specimen S under the control of the control unit 6. The light source 10 is configured with a halogen lamp, a xenon lamp, a light emitting diode (LED), or the like.

The condenser turret 1013 has a shape of disc, and a plurality of openings capable of holding the corresponding optical elements are formed in a circumferential direction of the main surface. The condenser turret 1013 is rotated about a specified axis as a rotation axis so that one of the openings is disposed on the optical path XA. The condenser turret 1013 holds a plurality of optical elements, which are switched to be used according to the observation method or the magnification of the objective lens 1018, in the corresponding openings. The condenser turret 1013 is rotatably disposed on the optical path XA between the polarizer 11 and the condenser lens 14. The condenser turret 1013 is rotated according to the observation method to insertably dispose one of the optical elements on the optical path XA. In addition, the condenser turret 1013 is rotated by a motor 1013a configured by a step motor, a DC motor, or the like under the driving control of the driving controller 1027.

Figure 14:
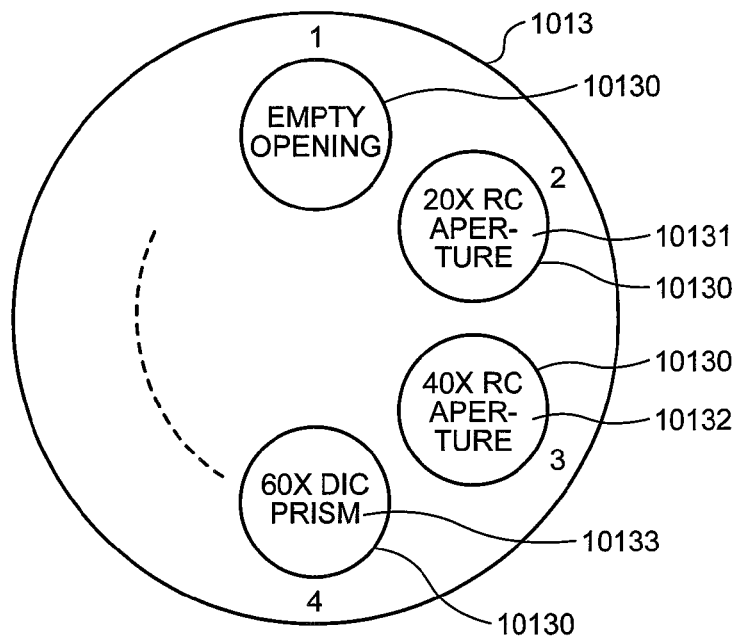
FIG. 14 is a schematic diagram illustrating a configuration of a condenser turret of the microscope according to the third embodiment of the present invention.

FIG. 14 is a schematic diagram illustrating a configuration of the condenser turret 1013. As illustrated in FIG. 14, the condenser turret 1013 has a disc shape and holds a plurality of relief contrast microscopy aperture plates of which magnifications are gradually increased in the circumferential direction of the main surface with reference to a specified empty opening 10130 which holds no optical element among the plurality of openings 10130. More specifically, the condenser turret 1013 holds a 20× RC aperture plate 10131 (first RC microscopy aperture plate), a 40× RC aperture plate 10132 (second RC microscopy aperture plate), and a 60×DIC prism 10133 in a plurality of openings 10130. More specifically, the condenser turret 1013 holds the 20× RC aperture plate 10131 (second), the 40× RC aperture plate 10132 (third), and the 60×DIC prism (fourth) in the openings 10130 in this order in the circumferential direction with reference to the empty opening 10130 (first).

The empty opening 10130 is disposed on the optical path XA due to the rotation of the condenser turret 1013. The empty opening 10130 is formed with a sufficient size so as not to block illumination light from the light source 10 and implements illumination with high numerical aperture. The empty opening 10130 is used, for example, when the microscope 1000 performs the BF microscopy or the PO microscopy. More specifically, when the microscope 1000 performs the BF microscopy, the empty opening 10130 is used when a user performs site searching in the petri dish 100 or positioning of a needle tip of a micropipette manipulated by a manipulator by using a 4× or 10× objective lens 1018 in order to prepare micro insemination.

The RC microscopy aperture plate 10131 is disposed on the optical path XA due to the rotation of the condenser turret 1013. The RC microscopy aperture plate 10131 is an aperture plate used for the RC microscopy, wherein a polarizing plate 10131*b* is included in a portion of an aperture 10131*a* formed at a position shifted (eccentric) from the optical axis of the optical path XA when the RC microscopy aperture plate 10131 is disposed on the optical path XA. The aperture 10131*a* is formed at the position shifted from the center of the RC microscopy aperture plate 10131, so that inclined illumination is implemented. For example, the RC microscopy aperture plate 10131 having the above-described configuration is used for the case where the user performs the 20× RC microscopy by using the microscope 1000.

The RC microscopy aperture plate 10132 is disposed on the optical path XA due to the rotation of the condenser turret 1013. The RC microscopy aperture plate 10132 is an aperture plate used for the RC microscopy, wherein a polarizing plate 10132*b* is included in a portion of an aperture 10132*a* formed at a position shifted (eccentric) from the optical axis of the optical path XA when the RC microscopy aperture plate 10132 is disposed on the optical path XA. The aperture 10132*a* is formed at the position shifted from the center of the RC microscopy aperture plate 10132, so that inclined illumination is implemented. For example, the RC microscopy aperture plate 10132 having the above-described configuration is used for the case where the user performs the 40× RC microscopy by using the microscope 1000.

The DIC prism 10133 is disposed on the optical path XA due to the rotation of the condenser turret 1013. A pair of the DIC prism 10133 and the DIC prism 20 disposed at an image side of the objective lens 1018 side described later constitute a differential interference optical system. The DIC prism 10133 is configured by using a Nomarski prism or the like. The DIC prism 10133 is used, for example, when the user performs the 60×DIC microscopy by using the microscope 1000.

In the condenser turret 1013 having the above-described configuration, the condenser turret 1013 is rotated by the motor 1013*a* according to the observation method, so that the optical element is switched so as to be disposed on the optical path XA. More specifically, in the condenser turret 1013, when performing the RC microscopy, the RC microscopy aperture plate 10131 or the RC microscopy aperture plate 10132 is disposed on the optical path XA; when performing the DIC microscopy, the DIC prism 10133 is disposed on the optical path XA; and when performing the BF microscopy or the PO microscopy, the empty opening 10130 is disposed on the optical path XA.

The turret position detector 1016 detects the optical element (opening number) of the condenser turret 1013 disposed on the optical path XA and outputs a result of the detection to the control unit 6. The turret position detector 1016 is configured by using an encoder, an optical photo-interrupter, or the like. In addition, the turret position detector 1016 may detect the optical element of the condenser turret 1013 disposed on the optical path XA based on the number of pulses of the motor 1013*a* which is driven according to a driving signal output from the driving controller 1027 to the motor 1013*a* and may output a result of the detection to the control unit 6.

The revolver 1017 is disposed on the optical path XA on the opposite side of the specimen S from the condenser turret 1013. In the revolver 1017, a plurality of holding portions 10170 (openings) capable of holding the corresponding objective lenses 1018 are formed in a circumferential direction of the main surface. The revolver 1017 disposes one of the holding portions 10170 on the optical path XA. The revolver 1017 is rotated by a motor 1017*a* configured by a step motor, a DC motor, or the like under the driving control of the driving controller 1027 to dispose the objective lens 1018 on the optical path XA according to the observation method. The revolver 1017 is configured by using a rotating revolver or the like.

Figure 15:
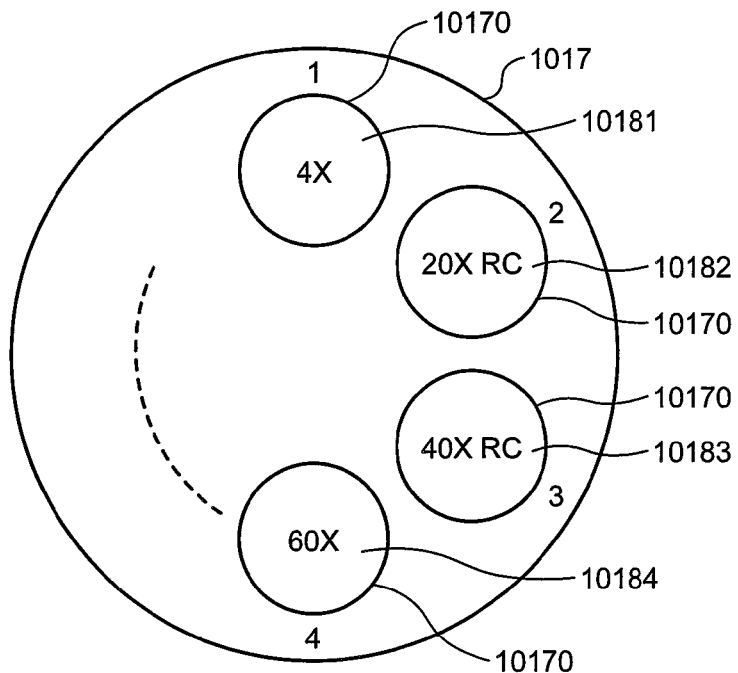
FIG. 15 is a schematic diagram illustrating a configuration of a revolver of the microscope according to the third embodiment of the present invention.

FIG. 15 is a schematic diagram illustrating arrangement of the objective lenses held in the holding portions 10170 of the revolver 1017.

As illustrated in FIG. 15, the revolver 1017 holds a 20× RC objective lens 10182 (second), a 40× RC objective lens 10183 (third), and a maximum-magnification objective lens 10184 (fourth), of which magnifications are increased in the circumferential direction with reference to a minimum-magnification objective lens 10181 (first), in the corresponding holding portions 10170.

The objective lens 10181 is an objective lens having magnification suitable for observation of a needle tip of a micropipette, for example, low magnification such as 4× and is used for the BF microscopy.

The objective lens 10182 is a 20×RC objective lens suitable for observation of an egg or a sperm and is used for the 20×RC microscopy. The objective lens 10182 is provided with a modulator 11821 having three areas having different transmittance at the pupil position of the objective lens 10182. The modulator 11821 has an area 11821*a* having transmittance of 100%, an area 11821*b* having transmittance of about 25%, and an area 11821*c* having transmittance of 0%. The modulator 11821 has a relationship of being optically conjugate to the 20×RC microscopy aperture plate 10131 disposed at the pupil position of the condenser lens 14. In addition, the objective lens 10182 is also used for the PO microscopy requiring almost the same magnification when observing the spindle of the egg as a main observation object.

The objective lens 10183 is a 40× RC objective lens suitable for observation of an egg or a sperm and is used for the 40× RC microscopy. The objective lens 10183 is provided with a modulator (not illustrated) having three areas having different transmittance at the pupil position of the objective lens 10183.

The objective lens 10184 is an objective lens having magnification suitable for selection of a high-quality sperm, for example, high magnification such as 60× or 100× and is used for DIC microscopy.

The driving controller 1027 is used by using a driver, a central processing unit (CPU), and the like and moves or rotates the optical units of the microscope body 1002 under the control of the control unit 6. More specifically, the driving controller 1027 drives the motor 11*a*, the motor 12*a*, the motor 1013*a*, the motor 15*a*, the motor 1017*a*, the motor 20*a*, and a motor 21*a* under the control of the control unit 6 to rotate or move the polarizer 11, the compensator 12, the condenser turret 1013, the stage 15, the revolver 1017, the DIC prism 20, and the analyzer 21 to specified positions.

The recording unit 1005 records various programs executed in the microscope 1000 and various data used during the execution of the programs. The recording unit 1005 is configured by using semiconductor memory such as flash memory and random access memory (RAM). In addition, the recording unit 1005 includes a setting information recording unit 1051 which records setting information in correspondence to the position information of each optical unit on the optical path XA for each observation method.

FIG. 16 is diagram illustrating the setting information recorded by the setting information recording unit 1051.

As illustrated in FIG. 16, a combination of the objective lens 1018 of the revolver 1017 and the optical element of the condenser turret 1013 according to each observation method is recorded as setting information T10. As illustrated in FIG.

16, when performing the BF microscopy, a combination of the first objective lens 10181 and the empty opening 10130 is recorded.

The microscope 1000 having the above-described configuration can perform the BF microscopy, the RC microscopy, the PO microscopy, and the DIC microscopy by switching the position or the rotation angle of each of the polarizer 11, the compensator 12, the condenser turret 1013, the revolver 1017, the DIC prism 20, and the analyzer 21 on the optical path XA under the control of the control unit 6.

Figure 17:
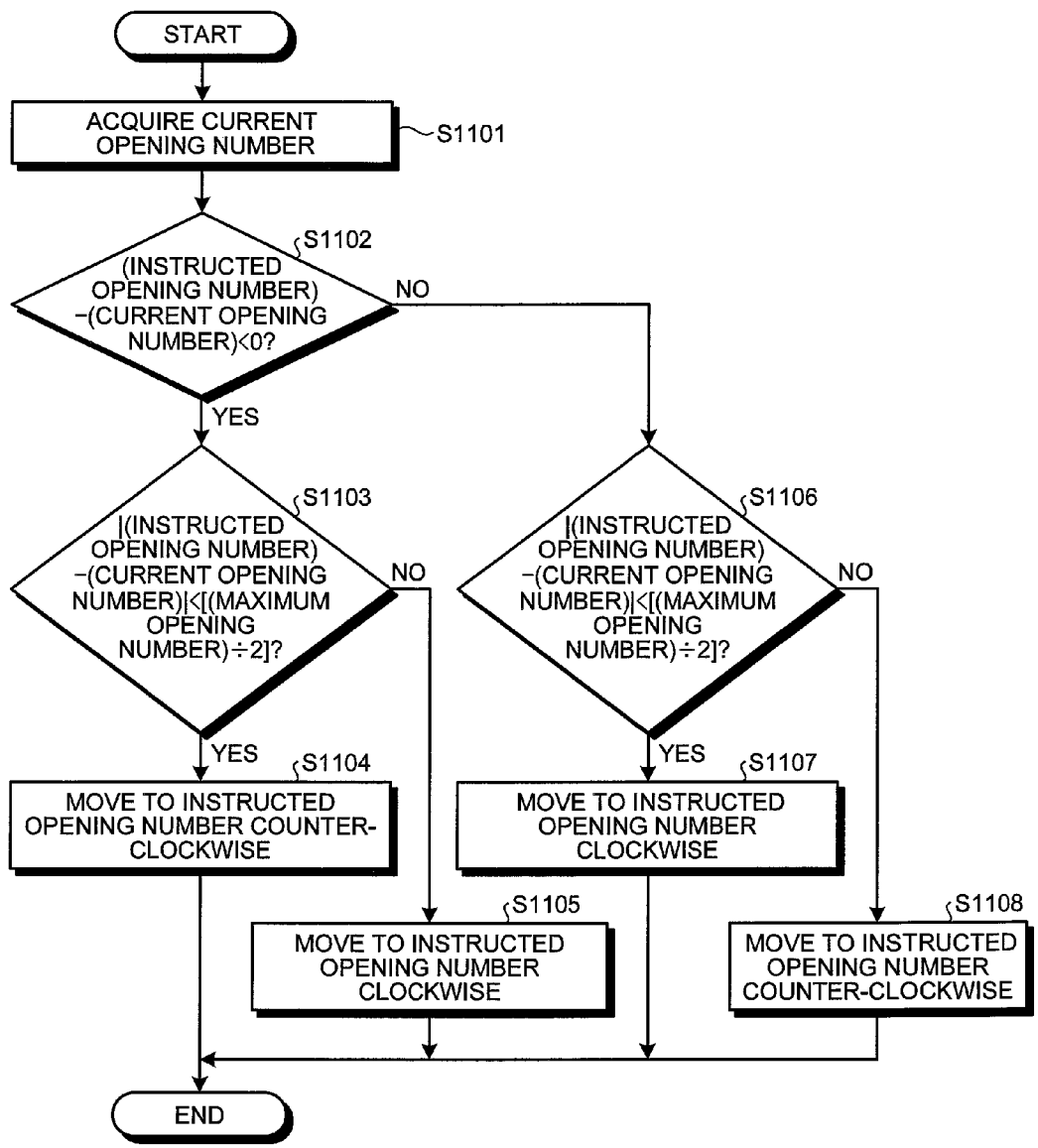
FIG. 17 is a flowchart illustrating overview of switching processes of a condenser turret and a revolver performed by the microscope according to the third embodiment of the present invention.

Next, the process of driving the condenser turret 1013 and the revolver 1017 performed by the microscope 1000 is described. FIG. 17 is a flowchart illustrating overview of switching processes in the condenser turret 1013 and the revolver 1017 performed by the microscope 1000. In addition, hereinafter, an example of driving of the revolver 1017 will be described.

As illustrated in FIG. 17, when an instruction signal for instructing the observation method is input from the operating input unit 3, the control unit 6 acquires a current opening number of the revolver 1017 on the optical path XA through the revolver position detector 19 (Step S1101).

Subsequently, when a value obtained by subtracting the current opening number from an instructed opening number of the opening in which the objective lens 1018 is mounted according to the observation method is negative ((instructed opening number)−(current opening number)<0) (Yes in Step S1102), the microscope 1000 proceeds to Step S1103 described later. On the contrary, when the value obtained by subtracting the current opening number from the instructed opening number of the opening in which the objective lens 1018 is mounted according to the observation method is not negative (No in Step S1102), the microscope 1000 proceeds to Step S1106 described later.

In Step S1103, when the absolute value of difference between the instructed opening number and the current opening number is smaller than a half of the maximum opening number ((instructed opening number)−(current opening number))<((maximum opening number)÷2)) (Yes in Step S1103), the microscope 1000 proceeds to Step S1104 described later. On the contrary, when the absolute value of difference between the instructed opening number and the current opening number is not smaller than a half of the maximum opening number (No in Step S1103), the microscope 1000 proceeds to Step S1105 described later.

In Step S1104, the control unit 6 drives the driving controller 1027 to move the revolver 1017 to the position of the instructed opening number counter-clockwise. After that, the microscope 1000 ends the process.

In Step S1105, the control unit 6 drives the driving controller 1027 to move the revolver 1017 to the position of the instructed opening number clockwise. After that, the microscope 1000 ends the process.

In Step S1106, when the absolute value of difference between the instructed opening number and the current opening number is smaller than a half of the maximum opening number ((instructed opening number)−(current opening number))<((maximum opening number)÷2)) (Yes in Step S1106), the microscope 1000 proceeds to Step S1107 described later. On the contrary, when the absolute value of difference between the instructed opening number and the current opening number is not smaller than a half of the maximum opening number (No in Step S1106), the microscope 1000 proceeds to Step S1108 described later.

In Step S1107, the control unit 6 drives the driving controller 1027 to move the revolver 1017 to the position of the instructed opening number clockwise. After that, the microscope 1000 ends the process.

In Step S1108, the control unit 6 drives the driving controller 1027 to move the revolver 1017 the position of the instructed opening number counter-clockwise. After that, the microscope 1000 ends the process.

In this manner, the control unit 6 performs the above-described switching process on the revolver 1017 through the driving controller 1027 to determine the rotation direction for rotating the revolver 1017 based on the relationship between the current opening number and the instructed opening number and rotate the revolver 1017 clockwise or counter-clockwise. Therefore, even when inserting the opening number corresponding to the observation method in the instruction signal input from the operating input unit 3 onto the optical path XA, it is possible to minimize the movement amount (rotation amount) of the revolver 1017. In addition, in the case of the condenser turret 1013, the control unit 6 performs the same switching process. Accordingly, it is possible to minimize the movement amount of the condenser turret 1013.

Next, reference will be made in detail to the movement of the condenser turret 1013 and the movement of the revolver 1017 at the time of switching the observation method when performing the ICSI in the microscope 1000.

FIG. 18A is a diagram illustrating a procedure in the microscope 1000 according to the third embodiment when a user performs the ICSI by using the BF microscopy and the RC microscopy. FIG. 18B is a diagram illustrating a procedure in the microscope 1000 according to the third embodiment when a user performs the ICSI by using the BF microscopy, the RC microscopy, and the PO microscopy. FIG. 18C is a diagram illustrating a procedure in the microscope 1000 according to the third embodiment when a user performs the ICSI by using the BF microscopy, the RC microscopy, and the DIC microscopy. FIG. 18D is a diagram illustrating a procedure in the microscope 1000 according to the third embodiment when a user performs the ICSI by using the BF microscopy, the RC microscopy, the PO microscopy, and the DIC microscopy.

First, reference will be made to the case where the user performs the ICSI in the microscope 1000 by using the BF microscopy and the RC microscopy. In this case, as illustrated in FIG. 18A, if the microscope 1000 is powered on by the user, the microscope 1000 performs an initialization process (A1).

Subsequently, as illustrated in (1) of FIG. 18A, the control unit 6 drives the driving controller 1027 to move the polarizer 11, the compensator 12, the condenser turret 1013, the revolver 1017, the DIC prism 20, and the analyzer 21 to the positions for the BF microscopy (A2). In this case, the control unit 6 inserts the first opening of the revolver 1017 onto the optical path XA and inserts the first opening of the condenser turret 1013 onto the optical path XA. After the movement of the revolver 1017 and the movement of the condenser turret 1013 are completed, the user adjusts the position of the holding pipette installed in the manipulator (not illustrated) (A3).

Next, when the instruction signal for instructing the 20× RC microscopy is input by using the button B2 of the operating input unit 3 (A4), the control unit 6 drives the driving controller 1027 to move the polarizer 11, the compensator 12, the condenser turret 1013, the revolver 1017, the DIC prism 20, and the analyzer 21 to the positions for the 20× RC microscopy (A5). In this case, as illustrated in (2) of FIG. 18A, the control unit 6 inserts the second opening of the revolver 1017 onto the optical path XA and inserts the second opening of the condenser turret 1013 onto the optical path XA. At this time, each of the movement amount of the revolver 1017 and the movement amount of the condenser turret 1013 is a movement amount for one opening. After the movement of the revolver 1017 and the movement of the condenser turret 1013 are completed, the user manually or electrically moves the stage 15 in order to observe the sperm selection drop R2 containing the sperm S12 (A6). After the stage 15 is moved, the user selects the sperm S12 which is to be injected (A7).

Subsequently, the instruction signal for instructing the 40× RC microscopy is input by using the button B3 of the operating input unit 3 (A8), the control unit 6 drives the driving controller 1027 to move the polarizer 11, the compensator 12, the condenser turret 1013, the revolver 1017, the DIC prism 20, and the analyzer 21 to the positions for the 20× RC microscopy (A9). In this case, as illustrated in (3) of FIG. 18A, the control unit 6 inserts the third opening of the revolver 1017 onto the optical path XA and inserts the third opening of the condenser turret 1013 onto the optical path XA. At this time, each of the movement amount of the revolver 1017 and the movement amount of the condenser turret 1013 is a movement amount for one opening. After the movement of the revolver 1017 and the movement of the condenser turret 1013 are completed, the user damages a tailpiece of the sperm S12 with an injection pipette to immobilize the sperm S12 and aspirates the immobilized sperm S12 with the injection pipette (A10).

Next, when the instruction signal for instructing the 20×RC microscopy is input by using the button B2 of the operating input unit 3 (A11), the control unit 6 drives the driving controller 1027 to move the polarizer 11, the compensator 12, the condenser turret 1013, the revolver 1017, the DIC prism 20, and the analyzer 21 to the positions for the 20×RC microscopy (A12). In this case, as illustrated in (4) of FIG. 18A, the control unit 6 inserts the second opening of the revolver 1017 onto the optical path XA and inserts the second opening of the condenser turret 1013 onto the optical path XA. At this time, each of the movement amount of the revolver 1017 and the movement amount of the condenser turret 1013 is a movement amount for one opening. After the movement of the revolver 1017 and the movement of the condenser turret 1013 are completed, the user manually or electrically moves the stage 15 in order to observe the ICSI drop R1 containing an egg S11 (A13). After the stage 15 is moved, the user fixes an egg S11 which is to be fertilized with a holding pipette (A14) and pierces the egg S11 with an injection pipette to inject the sperm S12 into the egg S11 (A15).

Subsequently, the user manually or electrically moves the stage 15 in order to observe the sperm selection drop R2 containing the sperm S12 (A16). In this case, as illustrated in (5) of FIG. 18A, the control unit 6 maintains the state where the second opening of the revolver 1017 is inserted onto the optical path XA and maintains the state where the second opening of the condenser turret 1013 is inserted onto the optical path XA. Therefore, the revolver 1017 and the condenser turret 1013 are not moved. Next, the microscope 1000 repeats (2) of FIG. 18A to (5) of FIG. 18A described above (A7 to A15).

When the user performs the ICSI in the microscope 1000 by using the BF microscopy and the RC microscopy in this manner, each of the movement amount of the revolver 1017 and the movement amount of the condenser turret 1013 is at most a movement amount for one opening.

Next, reference will be made to the case where the user performs the ICSI in the microscope 1000 by using the BF microscopy, the RC microscopy, and the PO microscopy. In this case, as illustrated in FIG. 18B, (1) to (4) of FIG. 18B correspond to (1) to (4) of FIG. 18A.

Subsequently, as illustrated in (5) of FIG. 18B, when the instruction signal for instructing the 20× PO microscopy is input by using the button B4 of the operating input unit 3 (B15), the control unit 6 drives the driving controller 1027 to move the polarizer 11, the compensator 12, the condenser turret 1013, the revolver 1017, the DIC prism 20, and the analyzer 21 to the positions for the 20× PO microscopy (B16). In this case, the control unit 6 maintains the state where the second opening of the revolver 1017 is inserted onto the optical path XA and inserts the first opening of the condenser turret 1013 onto the optical path XA. At this time, the movement amount of the condenser turret 1013 is a movement amount for one opening, and the objective lens 1018 is not moved. After the condenser turret 1013 is moved, the user searches for the spindle in the egg S11 to specify the position of the spindle (B17).

Next, as illustrated in (6) of FIG. 18B, when the instruction signal for instructing the 20×RC microscopy is input by using the button B2 of the operating input unit 3 (B18), the control unit 6 drives the driving controller 1027 to move the polarizer 11, the compensator 12, the condenser turret 1013, the revolver 1017, the DIC prism 20, and the analyzer 21 to the positions for the 20× RC microscopy (B19). In this case, the control unit 6 maintains the state where the second opening of the revolver 1017 is inserted onto the optical path XA and inserts the second opening of the condenser turret 1013 onto the optical path XA. At this time, the movement amount of the condenser turret 1013 is a movement amount for one opening, and the objective lens 1018 is not moved. After the condenser turret 1013 is moved, the user pierces the egg S11 with an injection pipette while avoiding the spindle of the egg S11 to inject the sperm S12 into the egg S11. Next, the microscope 1000 repeats (2) to (6) of FIG. 18B described above.

When the user performs the ICSI in the microscope 1000 by using the BF microscopy, the RC microscopy, the and the PO microscopy in this manner, each of the movement amount of the revolver 1017 and the movement amount of the condenser turret 1013 is at most a movement amount for one opening.

Next, reference will be made to the case where the user performs the ICSI in the microscope 1000 by using the BF microscopy, the RC microscopy, and the DIC microscopy. In this case, as illustrated in FIG. 18C, (1) and (2) of FIG. 18C correspond to (1) and (2) of FIG. 18A, respectively.

As illustrated in (3) of FIG. 18C, when the instruction signal for instructing the DIC microscopy is input by using the button B5 of the operating input unit 3 (C8), the control unit 6 drives the driving controller 1027 to move the polarizer 11, the compensator 12, the condenser turret 1013, the revolver 1017, the DIC prism 20, and the analyzer 21 to the positions for the DIC microscopy (C9). In this case, the control unit 6 inserts the fourth opening of the revolver 1017 onto the optical path XA and inserts the fourth opening of the condenser turret 1013 onto the optical path XA. At this time, each of the movement amount of the revolver 1017 and the movement amount of the condenser turret 1013 is a movement amount for two openings. After the revolver 1017 and the condenser turret 1013 are moved, the user observes the internal state of the head of the sperm S12 to select the sperm S12 having no vacuoles in the head of the sperm S12 (C10).

As illustrated in (4) of FIG. 18C, when the instruction signal for instructing the 40× RC microscopy is input by using the button B3 of the operating input unit 3 (C11), the control unit 6 drives the driving controller 1027 to move the polarizer 11, the compensator 12, the condenser turret 1013, the revolver 1017, the DIC prism 20, and the analyzer 21 to the positions for the 40× RC microscopy (C12). At this time, each of the movement amount of the revolver 17 and the movement amount of the condenser turret 1013 is a movement amount for one opening. After the revolver 1017 and the condenser turret 1013 are moved, the user damages a tailpiece of the sperm S12 with an injection pipette to immobilize the sperm S12 and aspirates the immobilized sperm (C13). Next, the microscope 1000 repeats (2) to (6) of FIG. 18C described above.

When the user performs the ICSI in the microscope 1000 by using the BF microscopy, the RC microscopy, and the DIC microscopy in this manner, each of the movement amount of the revolver 1017 and the movement amount of the condenser turret 1013 is at most a movement amount for two openings.

Next, reference will be made to the case where the user performs the ICSI in the microscope 1000 by using the BF microscopy, the RC microscopy, the PO microscopy, and the DIC microscopy. In this case, as illustrated in FIG. 18D, (1) to (5) of FIG. 18D correspond to (1) to (5) of FIG. 18C described above, respectively.

Subsequently, as illustrated in (6) of FIG. 18D, when the instruction signal for instructing the 20× PO microscopy is input by using the button B4 of the operating input unit 3 (D19), the control unit 6 drives the driving controller 1027 to move the polarizer 11, the compensator 12, the condenser turret 1013, the revolver 1017, the DIC prism 20, and the analyzer 21 to the positions for the 20× PO microscopy (D20). In this case, the control unit 6 maintains the state where the second opening of the revolver 1017 is inserted onto the optical path XA and inserts the first opening of the condenser turret 1013 onto the optical path XA. At this time, the movement amount of the condenser turret 1013 is a movement amount for one opening, and the objective lens 1018 is not moved. After the condenser turret 1013 is moved, the user searches for the spindle in the egg S11 to specify the position of the spindle (D21).

Next, as illustrated in (7) of FIG. 18D, when the instruction signal for instructing the 20× RC microscopy is input by using the button B2 of the operating input unit 3 (D22), the control unit 6 drives the driving controller 1027 to move the polarizer 11, the compensator 12, the condenser turret 1013, the revolver 1017, the DIC prism 20, and the analyzer 21 to the positions for the 20× RC microscopy (D23). In this case, the control unit 6 maintains the state where the second opening of the revolver 1017 is inserted onto optical path XA and inserts the second opening of the condenser turret 1013 onto the optical path XA. At this time, the movement amount of the condenser turret 1013 is a movement amount for one opening, and the objective lens 1018 is not moved. After the condenser turret 1013 is moved, the user pierces the egg S11 with an injection pipette while avoiding the spindle of the egg S11 to inject the sperm S12 into the egg S11. Subsequently, the microscope 1000 repeats (2) to (7) of FIG. 18C.

When the user performs the ICSI in the microscope 1000 by using the BF microscopy, the RC microscopy, the PO microscopy, and the DIC microscopy in this manner, each of the movement amount of the revolver 1017 and the movement amount of the condenser turret 1013 is at most a movement amount for two openings.

According to the above-described third embodiment of the present invention, the arrangement of each objective lens installed in each opening of the revolver 1017 and the arrangement of each optical element installed in each opening of the condenser turret 1013 are optimized for the ICSI. Therefore, it is possible to minimize the switching time of the observation method in the ICSI. As a result, the working time of the ICSI can be reduced, so that it is possible to minimize the time for placing the egg outside an incubator.

Modified Example 1 of Third Embodiment

In the third embodiment of the present invention, the arrangement of the objective lenses installed in the corresponding openings of the revolver 1017 and the arrangement of the optical elements installed in the corresponding openings of the condenser turret 1013 may be changed. In addition, the same components as those of the microscope 1000 according to the above-described third embodiment are denoted by the same reference numerals, and the description thereof is omitted.

Figure 19:
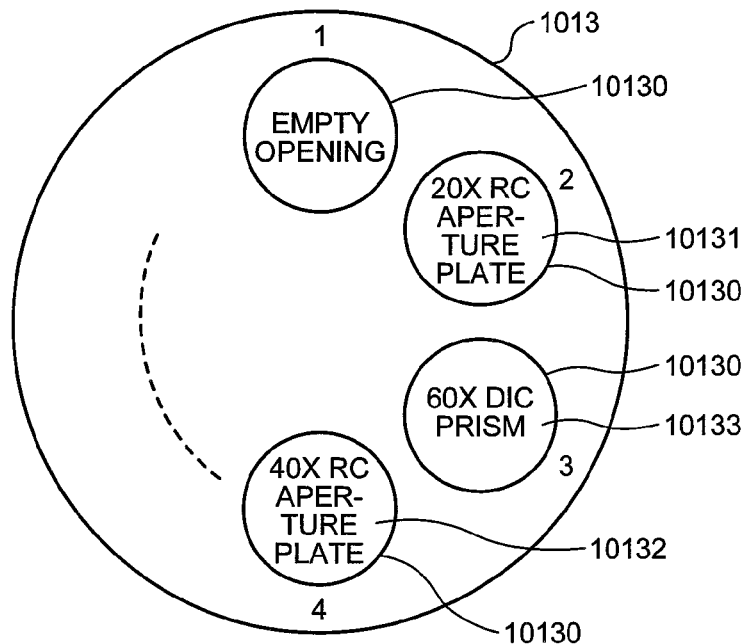
FIG. 19 is a schematic diagram illustrating arrangement of optical elements installed in openings of a condenser turret of a microscope according to Modified Example 1 of the third embodiment of the present invention.

FIG. 19 is a schematic diagram illustrating the arrangement of the optical elements installed in the corresponding openings of the condenser turret according to Modified Example 1 of the third embodiment of the present invention.

As illustrated in FIG. 19, a 20× RC aperture plate 10131 (second) and a 40× RC aperture plate 10132 (fourth) are installed on the condenser turret 1013 in the circumferential direction from an empty opening 10130 (first). In addition, a 60×DIC prism 10133 (third) is installed between the 20× RC aperture plate 10131 and the 40× RC aperture plate 10132 on the condenser turret 1013.

Figure 20:
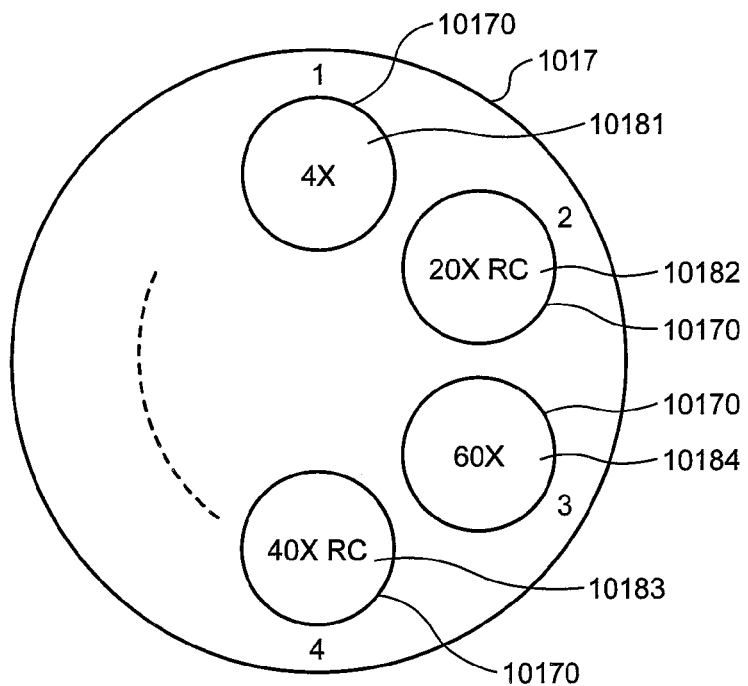
FIG. 20 is a schematic diagram illustrating arrangement of objective lenses installed in openings of a revolver of the microscope according to Modified Example 1 of the third embodiment of the present invention.

FIG. 20 is a schematic diagram illustrating the arrangement of the objective lenses installed in the corresponding openings of the revolver according to Modified Example 1 of the third embodiment of the present invention.

As illustrated in FIG. 20, a 20× RC microscopy objective lens 10182 (second) and a 40× RC microscopy objective lens 10183 (fourth) are provided in the revolver 1017 in the circumferential direction with reference to a 4× objective lens 10181 (first). In addition, a 60× objective lens 10184 (third) is installed between the 20× RC microscopy objective lens 10182 and the 40× RC microscopy objective lens 10183 in the revolver 1017.

Reference will be made in detail to the movement of the condenser turret 1013 and the movement of the revolver 1017 according to the switching of the observation method when performing the ICSI in the microscope 1000 having the above-described configuration.

FIG. 21A is a diagram illustrating a procedure in the microscope 1000 according to Modified Example 1 of the third embodiment of the present invention at the time of using the 20× RC microscopy for sperm immobilization and aspiration when the user performs the ICSI in the microscope 1000 by using the BF microscopy, the RC microscopy, and the DIC microscopy. FIG. 21B is a diagram illustrating a procedure in the microscope 1000 according to Modified Example 1 of the third embodiment of the present invention at the time of using the 20× RC microscopy for sperm immobilization and aspiration when the user performs the ICSI in the microscope 1000 by using the BF microscopy, the RC microscopy, the PO microscopy, and the DIC microscopy.

As illustrated in (4) of FIG. 21A and (4) of FIG. 21B, when the user performs the ICSI in the microscope 1000 by using the DIC microscopy, the user performs not the 40× RC microscopy but the 20× RC microscopy for immobilization of the sperm S12 and aspiration of the immobilized sperm with an injection pipette. In this case, each of the movement amount of the revolver 1017 and the movement amount of the condenser turret 1013 is at most a movement amount for one opening. For example, when the microscope 1000 switches the observation method from the set observation method to the 20× RC microscopy or the DIC microscopy, each of the movement amount of the revolver 1017 and the movement amount of the condenser turret 1013 is the movement amount for one opening.

FIG. 22A is a diagram illustrating a procedure in the microscope 1000 according to Modified Example 1 of the third embodiment of the present invention at the time of using the DIC observation for sperm immobilization and aspiration when the user performs the ICSI in the microscope 1000 by using the BF microscopy, the RC microscopy, and the DIC microscopy. FIG. 22B is a diagram illustrating a procedure in the microscope 1000 according to Modified Example 1 of the third embodiment of the present invention at the time of using the DIC observation for sperm immobilization and aspiration when the user performs the ICSI in the microscope 1000 by using the BF microscopy, the RC microscopy, the PO microscopy, and the DIC microscopy.

As illustrated in (4) of FIG. 22A and (4) of FIG. 22B, when the user uses the DIC microscopy in the microscope 1000, the user performs not the 40× RC microscopy but the DIC observation for immobilization of the sperm S12 and aspiration of the immobilized sperm with an injection pipette. In this case, the revolver 1017 and the condenser turret 1013 are not moved.

According to Modified Example 1 of the third embodiment of the present invention described hereinbefore, in the case of performing the ICSI in the microscope 1000 by using the DIC microscopy, when the observation method for immobilization of the sperm and aspiration of the immobilized sperm with an injection pipette is switched to the 40× RC microscopy to use the 20× RC microscopy or the DIC microscopy, it is possible to minimize the switching time of the observation method in the ICSI, so that it is possible to reduce the working time of the ICSI.

Modified Example 2 of Third Embodiment

In the third embodiment of the present invention, the arrangement of the objective lenses to be installed in the corresponding openings of the revolver 1017 may be further changed.

Figures 23, 24:
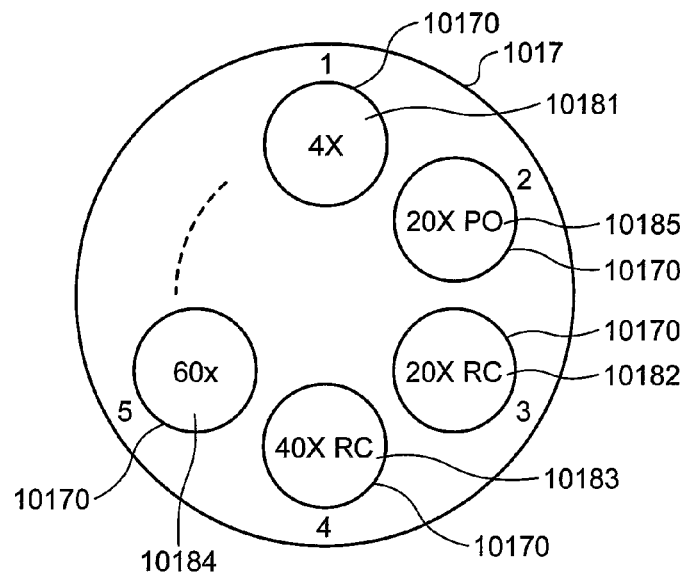
FIG. 23 is a schematic diagram illustrating arrangement of objective lenses installed in openings of a revolver of a microscope according to Modified Example 2 of the third embodiment of the present invention.
FIG. 24 is a diagram illustrating setting information recorded by a setting information recording unit of a recording unit of the microscope according to Modified Example 2 of the third embodiment of the present invention.

FIG. 23 is a schematic diagram illustrating the arrangement of the objective lenses installed in the corresponding openings of the revolver 1017 according to Modified Example 2 of the third embodiment of the present invention.

As illustrated in FIG. 23, a 20× PO microscopy objective lens 10185 (second), a 20× RC microscopy objective lens 10182 (third), a 40× RC microscopy objective lens 10183 (fourth), and a 60× objective lens 10184 (fifth) are installed on the revolver 1017 in the circumferential direction from a 4× objective lens 10181 (first).

FIG. 24 is a diagram illustrating setting information recorded by the setting information recording unit 1051 of the recording unit 1005. As illustrated in FIG. 24, a combination of an objective lens 1018 of the revolver 1017 and an optical element of the condenser turret 1013 corresponding to each observation method is recorded as setting information T12. For example, in Modified Example 2 of the third embodiment of the present invention, in the case of using the PO microscopy, a combination of the 20× PO microscopy objective lens 10185 and the empty opening 10130 is recorded.

Next, reference will be made in detail to the movement of the condenser turret 1013 and the movement of the revolver 1017 at the time of switching the observation method when performing the ICSI in the microscope 1000 having the above-described configuration.

FIG. 25A is a diagram illustrating a procedure in the microscope 1000 according to Modified Example 2 of the third embodiment of the present invention when the user performs the ICSI by using the BF microscopy and the RC microscopy. FIG. 25B is a diagram illustrating a procedure in the microscope 1000 according to Modified Example 2 of the third embodiment of the present invention when the user performs the ICSI by using the BF microscopy, the RC microscopy, and the PO microscopy. FIG. 25C is a diagram illustrating a procedure in the microscope 1000 according to Modified Example 2 of the third embodiment of the present invention when the user performs the ICSI by using the BF microscopy, the RC microscopy, and the DIC microscopy. FIG. 25D is a diagram illustrating a procedure in the microscope 1000 according to Modified Example 2 of the third embodiment of the present invention when the user performs the ICSI by using the BF microscopy, RC microscopy, PO microscopy, and the DIC microscopy.

As illustrated in (2) of FIG. 25A, (2) of FIG. 25B, (2) of FIG. 25C, and (2) of FIG. 25D, when the user performs the ICSI in the microscope 1000 by using the PO microscopy, at the time of using an objective lens 1018 different from the second objective lens 10182, each of the movement amount of the revolver 1017 and the movement amount of the condenser turret 1013 being switched for each observation method is a movement amount for two openings only in the case of switching the BF microscopy to the 20× RC microscopy; and in the other case, each of the movement amount of the revolver 1017 and the movement amount of the condenser turret 1013 is a movement amount for one opening or the revolver 1017 and the condenser turret 1013 are not moved. In addition, FIGS. 25A to 25D respectively correspond to FIGS. 18A to 18D described above.

According to Modified Example 2 of the third embodiment of the present invention described hereinbefore, when the user uses an objective lens 10185 different from the 20× RC microscopy objective lens 10182 for the PO microscopy, it is possible to minimize the switching time of the observation method in the ICSI, so that it is possible to reduce the working time of the ICSI.

Modified Example 3 of Third Embodiment

In the third embodiment of the present invention, the arrangement of the optical elements to be installed in the corresponding opening of the condenser turret 1013 and the arrangement of the objective lenses 1018 to be installed in the corresponding openings of the revolver 1017 may be further changed. In addition, the same components of the microscope 1000 according to the above-described third embodiment are denoted by the same reference numerals, and the description thereof is omitted.

Figure 26:
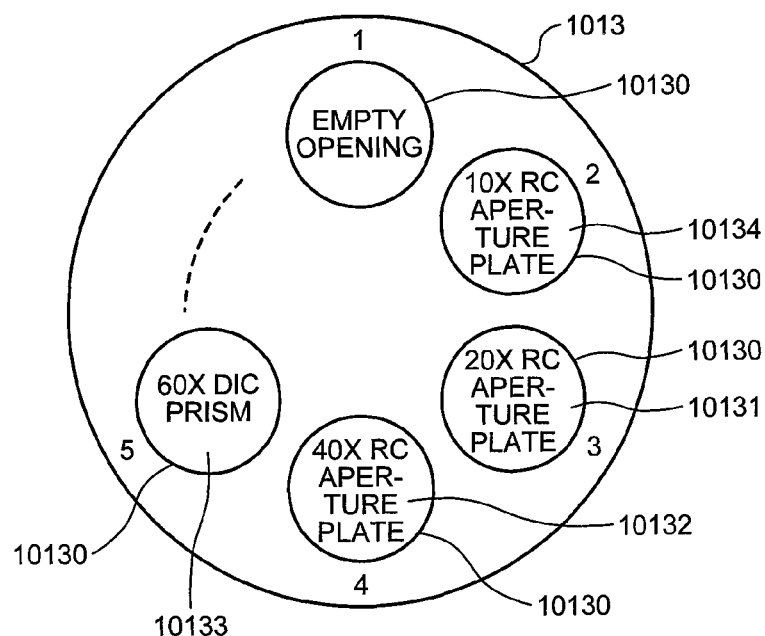
FIG. 26 is a schematic diagram illustrating arrangement of optical elements installed in openings of a condenser turret of a microscope according to Modified Example 3 of the third embodiment of the present invention.

FIG. 26 is a schematic diagram illustrating the arrangement of the optical elements installed in the corresponding openings of the condenser turret 1013 according to Modified Example 3 of the third embodiment of the present invention.

As illustrated in FIG. 26, a 10× RC aperture plate 10134 (second), a 20× RC aperture plate 10131 (third), a 40× RC aperture plate 10132 (fourth), and a 60×DIC prism 10133 (fifth) are installed in this order on the condenser turret 1013 in the circumferential direction from an empty opening 10130 (first).

Figure 27:
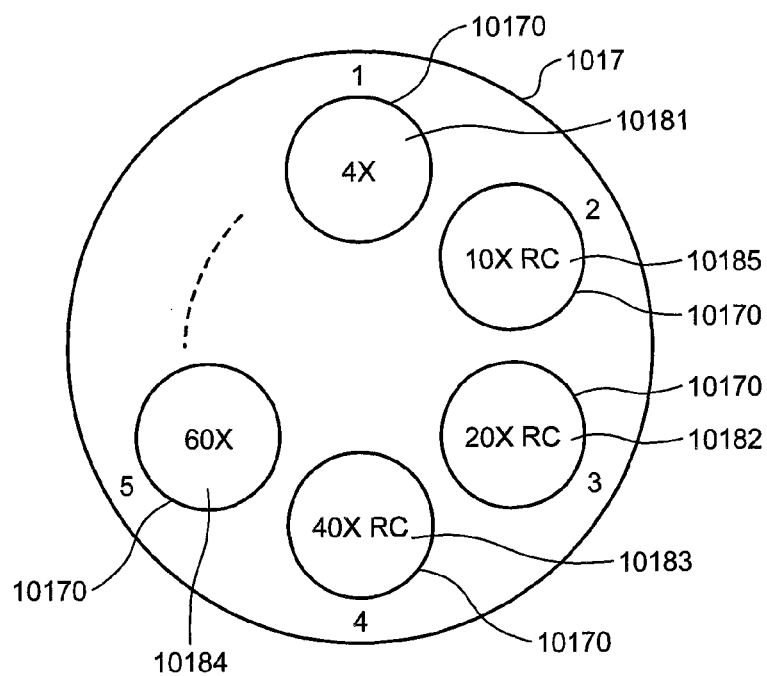
FIG. 27 is a schematic diagram illustrating arrangement of objective lenses installed in openings of a revolver of the microscope according to Modified Example 3 of the third embodiment of the present invention.

FIG. 27 is a schematic diagram illustrating the arrangement of the objective lenses 1018 installed in the corresponding openings of the revolver 1017 according to Modified Example 3 of the third embodiment of the present invention.

As illustrated in FIG. 27, a 10× RC microscopy objective lens 10185 (second), a 20× RC microscopy objective lens 10182 (third), a 40× RC microscopy objective lens 10183

(fourth), and a 60× objective lens 10184 (fifth) are installed on the revolver 1017 in the circumferential direction from a 4× objective lens 10181 (first) as a reference.

FIG. 28 is a diagram illustrating setting information recorded by the setting information recording unit 1051 of the recording unit 1005. As illustrated in FIG. 28, a combination of an objective lens 1018 of the revolver 1017 and an optical element of the condenser turret 1013 corresponding to each observation method is recorded in setting information T13. In Modified Example 3 of the third embodiment of the present invention, in the case of using the 10× RC microscopy, a combination of the 10× RC microscopy objective lens 10185 and the 10× RC aperture plate 10134 is recorded.

Next, reference will be made in detail to the movement of the condenser turret 1013 and the movement of the revolver 1017 in the case of using the 10× RC microscopy for needle alignment of the manipulator in combination of the observation methods used for the ICSI in the microscope 1000 having the above-described configuration.

FIG. 29A is a diagram illustrating a procedure in the microscope 1000 according to Modified Example 3 of the third embodiment of the present invention when the user performs the ICSI by using the BF microscopy and the RC microscopy. FIG. 29B is a diagram illustrating a procedure in the microscope 1000 according to Modified Example 3 of the third embodiment of the present invention when the user performs the ICSI by using the BF microscopy, the RC microscopy, and the PO microscopy. FIG. 29C is a diagram illustrating a procedure in the microscope 1000 according to Modified Example 3 of the third embodiment of the present invention when the user performs the ICSI by using the BF microscopy, the RC microscopy, and the DIC microscopy. FIG. 29D is a diagram illustrating a procedure in the microscope 1000 according to Modified Example 3 of the third embodiment of the present invention when the user performs the ICSI by using the BF microscopy, the RC microscopy, the PO microscopy, and the DIC microscopy.

As illustrated in (1) of FIG. 29A, (1) of FIG. 29B, (1) of FIG. 29C, and (1) of FIG. 29D, when the user performs positioning of the manipulator in the microscope 1000 by using the 10× RC microscopy, each of the movement amount of the revolver 1017 and the movement amount of the condenser turret 1013 being switched for each observation method is at most a movement amount for two openings. In addition, FIGS. 29A to 29D respectively correspond to FIGS. 18A and 18D described above.

Next, reference will be made in detail to the movement of the condenser turret 1013 and the movement of the revolver 1017 in the case of using the 10× RC microscopy for holding the egg and injecting the sperm into the egg in combination of the observation methods used for the ICSI in the microscope 1000.

FIG. 30A is a diagram illustrating a procedure in the microscope 1000 according to Modified Example 3 of the third embodiment of the present invention when the user performs the ICSI by using the BF microscopy and the RC microscopy. FIG. 30B is a diagram illustrating a procedure in the microscope 1000 according to Modified Example 3 of the third embodiment of the present invention when the user performs the ICSI by using the BF microscopy, the RC microscopy, and the PO microscopy. FIG. 30C is a diagram illustrating a procedure in the microscope 1000 according to Modified Example 3 of the third embodiment of the present invention when the user performs the ICSI by using the BF microscopy, the RC microscopy, and the DIC microscopy. FIG. 30D is a diagram illustrating a procedure in the microscope 1000 according to Modified Example 3 of the third embodiment of the present invention when the user performs the ICSI by using the BF microscopy, the RC microscopy, the PO microscopy, and the DIC microscopy.

As illustrated in (4) and (5) of FIG. 30A, (4) and (5) of FIG. 30B, (4) and (5) of FIG. 30C, and (4) and (5) of FIG. 30D, when the user performs the 10× RC microscopy in the microscope 1000 at the time of holding the egg S11 and injecting the sperm into the egg, each of the movement amount of the revolver 1017 and the movement amount of the condenser turret 1013 being switched for each observation method is at most a movement amount for two openings. In addition, FIGS. 30A to 30D respectively correspond to FIGS. 18A to 18D described above.

According to Modified Example 3 of the third embodiment of the present invention described hereinbefore, when the user performs needle alignment of the manipulator, or holding the egg S11 and injecting the sperm into the egg S11 by using the 10× RC microscopy instead of the BF microscopy or the 20× RC microscopy, it is possible to minimize the switching time of the observation method in the ICSI, so that it is possible to reduce the working time of the ICSI.

In addition, according to Modified Example 3 of the third embodiment of the present invention, since the 10× RC microscopy in addition to the 20× RC microscopy and the 40×RC microscopy can be used for the ICSI, various adaptations can be performed for the specimen S.

In addition, in the present invention, an example of the microscope including the microscope body, the operating input unit, display unit, the recording unit, and the control unit is described. However, the present invention may be applied to, for example, an imaging apparatus such as a video microscope including an objective lens for magnifying a specimen, an imaging function of imaging the specimen through the objective lens, and a display function of displaying an image, In addition, in the present invention, the clockwise arrangement of the optical elements installed in the condenser turret and the clockwise arrangement of the objective lenses installed in the revolver are described. However, the present invention may be applied to, for example, the counter-clockwise arrangement thereof in the circumferential direction from the empty opening and the first objective lens as a reference.

In addition, in the present invention, the polarizer is rotated in order to allow the polarizer and the analyzer to be in the crossed Nocols state. However, the present invention may be applied to, for example, the case of rotating the analyzer. In addition, the present invention may be applied to the case of individually rotating the polarizer and the analyzer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
   a light source configured to generate light to illuminate a specimen;
   a plurality of optical units, each of which is disposable on an optical path of the light and is configured to change optical characteristics of the light, wherein an arrangement of each of the plurality of optical units on the optical path is configured to be changed according to each of a plurality of observation methods used for intracytoplasmic sperm injection;

a condenser turret which has a disc shape and has a plurality of openings in a circumferential direction of a main surface of the condenser turret, each of the plurality of openings being configured to hold an optical element, and the condenser turret being configured to be rotated about a specified axis as a rotation axis so that one of the plurality of openings is disposed on the optical path; and a revolver which has a plurality of holding portions in a circumferential direction of a main surface of the revolver, each of the plurality of holding portions being configured to hold an objective lens, and one of the plurality of holding portions being configured to be disposed on the optical path, wherein, in the condenser turret, a plurality of relief contrast microscopy aperture plates are configured to be held in corresponding openings from among the plurality of openings, and magnifications of the plurality of relief contrast microscopy aperture plates gradually increase in the circumferential direction of the main surface of the condenser turret with respect to a specified empty opening which holds no optical element from among the plurality of openings, and wherein, in the revolver, a plurality of relief contrast microscopy objective lenses are configured to be held in corresponding holding portions from among the plurality of holding portions, and magnifications of the plurality of relief contrast microscopy objective lenses gradually increase in the circumferential direction of the main surface of the revolver with respect to a first objective lens having a minimum magnification and being held in one of the plurality of holding portions.

2. The microscope according to claim 1, wherein:

when the microscope performs the intracytoplasmic sperm injection by using a bright field microscopy, a relief contrast microscopy, and a differential interference contrast microscopy in this order, the condenser turret further holds a DIC prism in a corresponding opening which comes after the openings in which the plurality of relief contrast microscopy aperture plates are held in the circumferential direction of the main surface of the condenser turret, and the revolver further holds an objective lens, a magnification of which is higher than a magnification of each of the plurality of relief contrast microscopy objective lenses, in a corresponding holding portion which comes after the holding portions in which the plurality of relief contrast microscopy objective lenses are held in the circumferential direction of the main surface of the revolver.

3. The microscope according to claim 2, wherein when the microscope performs the intracytoplasmic sperm injection by using a polarized light microscopy, the revolver further holds a polarized light microscopy objective lens, a magnification of which is higher than a magnification of the first objective lens, in a corresponding holding portion which comes after the holding portion in which the first objective lens is held in the circumferential direction of the main surface of the revolver.

4. The microscope according to claim 2, wherein:

the plurality of relief contrast microscopy aperture plates include a first relief contrast microscopy aperture plate and a second relief contrast microscopy aperture plates, the plurality of relief contrast microscopy objective lenses include a first relief contrast microscopy objective lens and a second relief contrast microscopy objective lens, when the microscope performs the intracytoplasmic sperm injection by using a plurality of relief contrast microscopy methods corresponding to different magnifications, the condenser turret holds the second relief contrast microscopy aperture plate, a numerical aperture of which is smaller than a numerical aperture of the first relief contrast microscopy aperture plate, in a corresponding opening which comes after the specified empty opening in the circumferential direction of the main surface of the condenser turret, and when the microscope performs the intracytoplasmic sperm injection by using the plurality of relief contrast microscopy methods corresponding to different magnifications, the revolver further the second relief contrast microscopy objective lens a magnification of which is higher than a magnification of the first objective lens and lower than a magnification of the first relief contrast microscopy objective lens, in a corresponding holding portion after a holding portion in which the first objective lens is held in the circumferential direction of the main surface of the revolver.

5. The microscope according to claim 1, wherein:

when the microscope performs the intracytoplasmic sperm injection by using a bright field microscopy, a relief contrast microscopy, and a differential interference contrast microscopy in this order, the condenser turret further holds a DIC prism in a corresponding opening which comes after an opening in which a first relief contrast microscopy aperture plate, which has a smallest numerical aperture from among the plurality of relief contrast microscopy aperture plates, is held in the circumferential direction of the main surface of the condenser turret, and when the microscope performs the intracytoplasmic sperm injection by using the bright field microscopy, the relief contrast microscopy, and the differential interference contrast microscopy in this order, the revolver further holds an objective lens, magnification of which is higher than a magnification of each of the relief contrast microscopy objective lenses, in a corresponding holding portion which comes after a holding portion in which a first relief contrast microscopy objective lens, which has a smallest magnification from among the plurality of relief contrast microscopy objective lenses, is held in the circumferential direction of the main surface of the revolver.

* * * * *